United States Patent
Okuda et al.

(10) Patent No.: US 6,899,650 B2
(45) Date of Patent: May 31, 2005

(54) HYDRAULIC AUTOMATIC TENSIONER AND POWER TRANSMITTING MECHANISM

(75) Inventors: Kazuma Okuda, Saitama (JP); Katsuya Minami, Saitama (JP); Shigeru Aoki, Saitama (JP); Tadashi Fujiwara, Saitama (JP); Shogo Yonemoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/383,516

(22) Filed: Mar. 10, 2003

(65) Prior Publication Data

US 2003/0171179 A1 Sep. 11, 2003

(30) Foreign Application Priority Data

Mar. 11, 2002 (JP) .......................... 2002-064733

(51) Int. Cl.[7] ............................. F16H 7/08; F16H 7/22
(52) U.S. Cl. ....................................... 474/110; 474/109
(58) Field of Search ...................... 474/100–111, 138; 305/10, 31

(56) References Cited

U.S. PATENT DOCUMENTS

| | | | | |
|---|---|---|---|---|
| 4,457,564 A | * | 7/1984 | Ruge et al. ................ | 305/149 |
| 4,507,103 A | * | 3/1985 | Mittermeier ............... | 474/110 |
| 5,030,169 A | * | 7/1991 | Kiso et al. ................. | 474/110 |
| 5,087,225 A | * | 2/1992 | Futami et al. ............. | 474/110 |
| 5,090,946 A | * | 2/1992 | Futami et al. ............. | 474/110 |
| 6,398,682 B1 | * | 6/2002 | Suzuki et al. ............. | 474/110 |
| 6,609,987 B1 | * | 8/2003 | Beardmore ................ | 474/111 |

FOREIGN PATENT DOCUMENTS

| | | | | | |
|---|---|---|---|---|---|
| DE | 3106516 A1 | * | 9/1982 | ............ | F16H/7/08 |
| DE | 10155364 A1 | * | 5/2003 | ............ | F16H/7/08 |
| EP | 1258655 A | * | 11/2002 | ............ | F16H/7/08 |
| JP | 08-128508 A | * | 5/1996 | ............ | F16H/7/08 |
| JP | 2000-205356 A | * | 7/2000 | ............ | F16H/7/12 |
| JP | 2000-220708 | | 8/2000 | | |
| JP | 2000-266144 A | * | 9/2000 | ............ | F16H/7/12 |
| JP | 2001-165251 A | * | 6/2001 | ............ | F16H/7/08 |
| JP | 2001-289290 | * | 10/2001 | ............ | F16H/7/08 |

* cited by examiner

*Primary Examiner*—Marcus Charles
(74) *Attorney, Agent, or Firm*—Westerman, Hattori, Daniels & Adrian, LLP

(57) ABSTRACT

A hydraulic automatic tensioner for adjusting the tension of a bell includes a first member with a piston formed integrally, a second member combined with the first member and axially movable relative to the first member, a cylinder formed integrally with the second member, together defining a fluid-reservoir chamber for hydraulic fluid, axially slidably receiving the piston, and a spring pushing the members apart. The piston and cylinder form a pressure chamber filled with hydraulic fluid. The second member has a leak passage through which fluid flows from the pressure chamber into the fluid-reservoir chamber. A control valve is placed in the leak passage, inhibiting flow of fluid from the pressure chamber into the fluid-reservoir chamber. A control device moves the control valve to close the leak passage when activated and makes it ineffective when deactivated so that the pressure chamber communicates with the fluid-reservoir chamber via the leak passage.

23 Claims, 18 Drawing Sheets

HYDRAULIC AUTOMATIC TENSIONER AND POWER TRANSMITTING MECHANISM

BACKGROUND OF THE INVENTION

1. Field of the Invention

The present invention relates to a hydraulic automatic tensioner to be applied to a power transmitting mechanism using a transmission member, such as an endless belt or chain, for driving engine accessories of an internal combustion engine, and a power transmitting mechanism.

2. Description of the Related Art

A prior art hydraulic automatic tensioner applied to a power transmitting mechanism including a transmission member is disclosed in, for example, JP2000-220708A. FIGS. 18 and 19 shows the basic construction of this prior art hydraulic automatic tensioner in schematic views.

This hydraulic automatic tensioner includes a first member 01 having the shape of a bottomed cylinder and provided with a connecting lug 01a, and a second member 02 having the shape of a bottomed cylinder and provided with a connecting lug 02a. The first member 01 and the second member 02 are combined so as to be slidable relative to each other and to define a fluid-reservoir chamber 03. A spring 05 is extended between the first member 01 and the second member 02 so as to push the members 01 and 02 away from each other. A piston 06 formed integrally with the first member 01 is fitted in a cylinder 07 formed integrally with the second member 02 to define a pressure chamber 04.

The pressure chamber 04 communicates with the fluid-reservoir chamber 03 by means of a connecting passage 08 extending along the bottom surface of the second member 02. The connecting passage 08 is provided with a check valve 09 that permits the flow of the hydraulic fluid from the fluid-reservoir chamber 03 into the pressure chamber 04 and prevents the return flow of the hydraulic fluid. A leak passage 010 is formed between the pressure chamber 04 and the fluid-reservoir chamber 03 along the bottom surface of the second member 02, and an orifice is formed in the leak passage 010.

The connecting lug 01a (02a) is attached to a fixed member, and the connecting lug 02a (01a) is used for applying pressure to an endless belt to tighten the endless belt properly. When the first ember 01 and the second member 02 are moved toward each other, i.e., when the automatic tensioner is contracted, as shown in FIG. 18 to reduce the tension of the endless belt, the check valve 09 is closed by the pressure in the pressure chamber 04, and the hydraulic fluid leaks gradually from the pressure chamber 04 through the leak passage 010 provided with the orifice into the fluid-reservoir chamber 03. Thus, the first member 01 and the second member 02 move toward each other, i.e., the automatic tensioner contracts in order that the endless belt may not be excessively tensioned.

When the first member 01 and the second member 02 are moved away from each other, i.e., when the automatic tensioner is extended, by the resilience of the spring 05 to tension the endless belt, the pressure chamber 04 expands and the check valve 09 opens the connecting passage 08. Consequently, the hydraulic fluid flows rapidly from the fluid-reservoir chamber 03 into the pressure chamber 04 because the connecting passage 08 exerts low resistance against the flow of the hydraulic fluid. Thus, the first member 01 and the second member 02 are moved rapidly away from each other to tension the endless belt properly so that power can be surely transmitted.

When this prior art hydraulic automatic tensioner is applied to a power transmitting mechanism using a belt for driving engine accessories of an internal combustion engine, it occurs sometimes that a high tension is exerted first on the belt, and then the tension decreases suddenly.

In such a case, the first member 01 and the second member 02 of the prior art hydraulic automatic tensioner are moved toward each other so that the automatic tensioner contracts when a high tension is applied to the belt in an initial stage. Consequently, the belt cannot be properly tensioned and the belt is unable to transmit power securely. Furthermore, the first member 01 and the second member 02 are unable to move away from each other, i.e., the automatic tensioner is unable to extend, according to the subsequent sudden decrease of the tension, the belt slackens, the belt slips relative to the pulleys and, consequently, the belt is unable to transmit power properly.

The present invention has been made in view of those problems and it is therefore an object of the present invention to provide a hydraulic automatic tensioner capable of properly coping with the sudden change of the tension of a transmission member and a special operating condition, and of always ensuring reliable power transmission.

SUMMARY OF THE INVENTION

With the foregoing object in view, according to a first aspect of the present invention, a hydraulic automatic tensioner for regulating the tension of an endless transmission member included in a power transmitting mechanism for transmitting power to engine accessories of an internal combustion engine through the transmission member comprises: a first member; a piston formed integrally with the first member; a second member coaxially combined with the first member so as to be axially movable relative to the first member, defining a fluid-reservoir chamber together with the first member, and provided with a leak passage; a cylinder formed integrally with the second member, axially slidably receiving the piston so as to form a pressure chamber filled with a hydraulic fluid; an elastic member pushing the first and the second member away from each other; a control valve placed in the leak passage and having a function to inhibit flow of the hydraulic fluid from the pressure chamber through the leak passage into the fluid-reservoir chamber; and a control device for making the function of the control valve effective to close the leak passage when activated and of making the function of the control valve ineffective when deactivated so that the pressure chamber is able to communicate with the fluid-reservoir chamber by means of the leak passage.

According to the present invention, when the transmission member is loaded excessively by the engine accessories, for example, in starting the internal combustion engine, the hydraulic automatic tensioner is restrained from excessive contraction by activating the control device to make the function of the control valve effective so that the transmission member slackens moderately. In the subsequent increase of the tension of the transmission member, the control valve permits the flow of the hydraulic fluid from the fluid-reservoir chamber into the pressure chamber, and the hydraulic automatic tensioner is able to respond satisfactorily to the change of the tension. Consequently, the slip of the transmission member relative to the pulleys can be prevented, the transmission member is able to transmit power securely and hence the durability of the transmission member can be improved.

In a normal state where the transmission member is not excessively loaded, the control device is deactivated to enable the pressure chamber to communicate with the fluid-reservoir chamber, so that a slack in the slack side of the transmission member is taken up gradually and the tight side of the same is tensioned quickly to transmit power securely.

Thus, the tension of the transmission member can be highly accurately controlled by the inexpensive, simple hydraulic automatic tensioner by opening and closing the control valve by the control device even if any large load is put on the transmission member, which greatly improves the function and reliability of the transmission member.

Desirably, the control valve is a check valve, and the control device includes means for opening the control valve when the same is deactivated and means for closing the control valve when the same is activated.

The hydraulic automatic tensioner may be provided with a connecting passage connecting the pressure chamber and the fluid-reservoir chamber, and may further comprise a check valve placed in the connecting passage and capable of permitting the flow of the hydraulic fluid from the fluid-reservoir chamber into the pressure chamber and of stopping the reverse flow of the hydraulic fluid.

When the hydraulic automatic tensioner is provided with the connecting passage that permits the flow of the hydraulic fluid from the fluid-reservoir chamber into the pressure chamber, the hydraulic automatic tensioner is able to extend quickly when the tension of the transmission member decreases to increase the tension of the transmission member, and the hydraulic automatic tensioner is able to contract gradually due to resistance exerted on the flow of the hydraulic fluid.

Preferably, the pressure chamber is formed in the fluid-reservoir chamber. When the pressure chamber is formed in the fluid-reservoir chamber, the hydraulic automatic tensioner can be formed in a compact, lightweight structure.

Preferably, the hydraulic automatic tensioner further comprises a pressurizing mechanism for applying pressure to the pressure chamber.

The hydraulic automatic tensioner can be extended by increasing the pressure in the pressure chamber by the pressurizing mechanism even when the tension of the transmission member is increased greatly to increase an initial tension, and the tension of the transmission member can be maintained by stopping the flow of the hydraulic fluid by the check valve to lock the hydraulic automatic tensioner. Thus, it is possible to prevent the slackening of the transmission member and the excessive tensioning of the transmission member due to a reaction to the slackening of the transmission member. Thus, the transmission member is able to transmit power without slipping and without being damaged.

The pressurizing mechanism may include a pressurizing member linearly movably fitted in a pressurizing passage connected to the pressure chamber, and a linear driving means; and the pressurizing member is moved linearly in the pressurizing passage to force the hydraulic fluid from the pressurizing passage into the pressure chamber.

The linear driving means is controlled in an on-off control mode to force the hydraulic fluid directly into the pressure chamber. Thus, the initial tension can be surely increased in quick response. When the linear driving means is a linear solenoid actuator provided with a variable-stroke working member, the initial tension can be continuously varied and the initial tension can be highly accurately controlled.

The pressurizing mechanism may be a crank mechanism including a crankshaft and a crankshaft driving means, and the piston may be driven by the crank mechanism to pressurize the pressure chamber. Since the crankshaft driving means of the crank mechanism drives the piston through a gear train and the crankshaft, the pressure of the hydraulic fluid does not act directly on the crankshaft driving means, which is effective in reducing power requirement.

The pressurizing passage may be connected to the leak passage or may be connected to a connecting passage connecting the pressure chamber and the fluid-reservoir chamber.

According to a second aspect of the present invention, a power transmitting mechanism for transmitting power to engine accessories of an internal combustion engine comprises: an endless transmission member for driving the engine accessories, and a hydraulic automatic tensioner for regulating tension of the transmission member; wherein the hydraulic automatic tensioner comprises: a first member; a piston formed integrally with the first member; a second member coaxially combined with the first member so as to be axially movable relative to the first member, defining a fluid-reservoir chamber together with the first member, and provided with a leak passage; a cylinder formed integrally with the second member, axially slidably receiving the piston so as to form a pressure chamber filled with a hydraulic fluid; an elastic member pushing the first and the second member away from each other; a control valve placed in the leak passage and having a function to inhibit flow of the hydraulic fluid from the pressure chamber through the leak passage into the fluid-reservoir chamber; and a control device for making the function of the control valve effective to close the leak passage when activated and of making the function of the control valve ineffective when deactivated so that the pressure chamber is able to communicate with the fluid-reservoir chamber by means of the leak passage.

The control valve may be a check valve, and the control device may include means for opening the control valve when the same is deactivated, and means for closing the control valve when the same is activated.

The power transmitting mechanism may be provided with a connecting passage connecting the pressure chamber and the fluid-reservoir chamber, and may further comprise a check valve placed in the connecting passage and capable of permitting the flow of the hydraulic fluid from the fluid-reservoir chamber into the pressure chamber and of stopping the reverse flow of the hydraulic fluid.

The power transmitting mechanism may further comprise a pressurizing mechanism for applying pressure to the pressure chamber, and the pressurizing mechanism may include a pressurizing member linearly movably placed in a pressurizing passage connected to the pressure chamber, and a linear driving means, and the pressurizing member may be moved linearly in the pressuring passage to force the hydraulic fluid from the pressurizing passage into the pressure chamber.

The pressurizing mechanism may be a crank mechanism including a crankshaft and a crankshaft driving means, and the piston may be driven by the crank mechanism to pressurize the pressure chamber. The pressurizing passage may be connected to the leak passage.

The engine accessories include at least an electric motor, and the pressurizing mechanism may be operated by an operating means before the electric motor is actuated. Thus, the hydraulic automatic tensioner is capable of properly coping with increase in the tension of the transmission member when the electric motor operates, for example, for starting the internal combustion engine, for operation in a motor-assisted driving mode or for operation in an auxiliary driving mode with the internal engine stopped, and coping with decrease in the tension after the electric motor has been stopped.

The second member is able to exert a pressure to a side of the transmission member that is a slack side when the internal combustion engine drives the transmission member and is a tight side when the electric motor drives the transmission member.

The tension of such a side of the transmission member that is a slack side when the internal combustion engine drives the transmission member or is a tight side when the electric motor operates changes most violently. The hydraulic automatic tensioner functions most effectively by applying pressure to such a side of the transmission member by the second member to enable the transmission member to transmit power securely.

Preferably, the control device is activated only when the electric motor operates for driving. The first and the second member are restrained from moving toward each other and can move away from each other by thus activating the control device when the electric motor operates for driving and a high tension is applied to the transmission member. The first and the second member can be quickly moved away from each other when the tension of the transmission member decreases immediately after the application of the high tension to the transmission member to ensure that power is transmitted always securely. The hydraulic automatic tensioner is able to operate for a normal tension regulating operation when the control device is deactivated.

Desirably, the electric motor is capable of serving also as a generator. When the electric motor is capable of serving as a generator, the engine accessories do not need to include a generator additionally, which enables forming the power transmitting mechanism in a compact arrangement.

DESCRIPTION OF THE PREFERRED EMBODIMENTS

Preferred embodiments of the present invention will be described with reference to the accompanying drawings.

Figure 1:
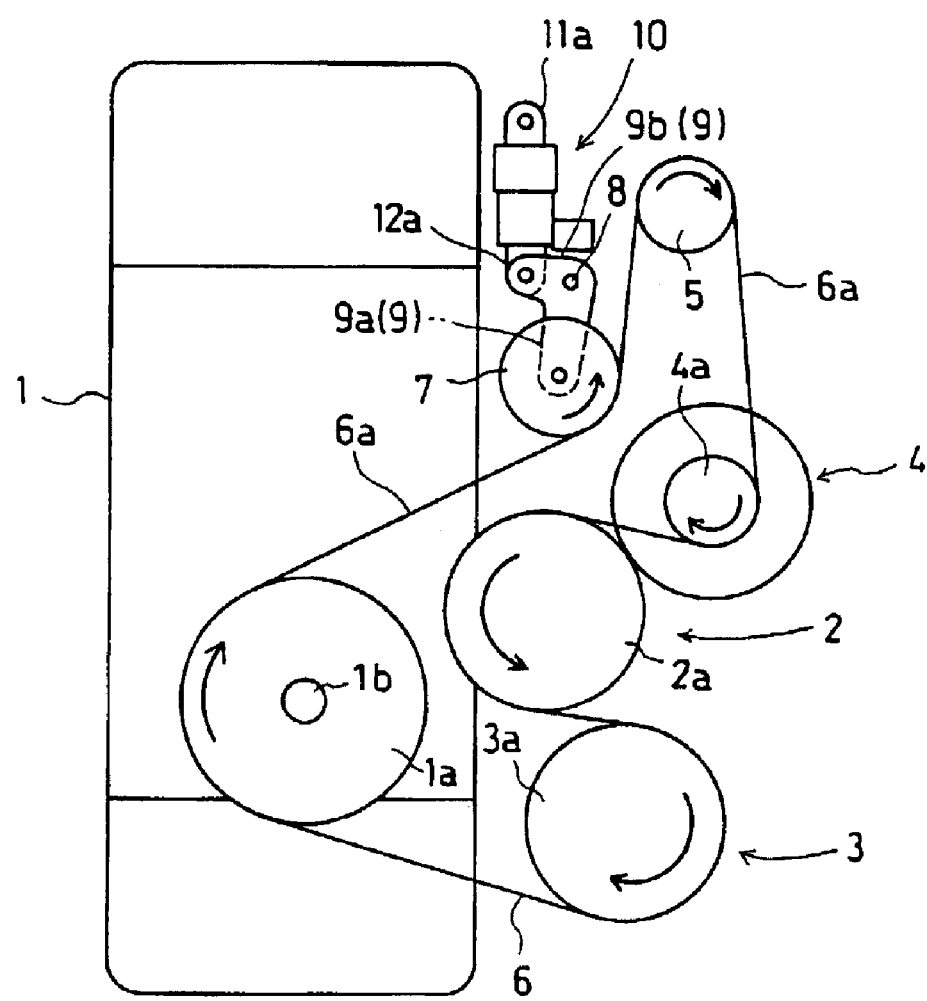
FIG. 1 is a schematic side elevation of an internal combustion engine provided with a power transmitting mechanism for transmitting power to the engine accessories of the internal combustion engine, including a hydraulic automatic tensioner according to the present invention.

Referring to FIG. 1, engine accessories 2 and 3 and an electric motor 4 that operates also as a generator are disposed in the vicinity of an internal combustion engine 1. A crankshaft pulley 1a is mounted on a part, projecting from the internal combustion engine 1, of a crankshaft 1b. Accessory pulleys 2a and 3a are mounted on the shafts of the engine accessories 2 and 3 projecting from the engine accessories 2 and 3 on the side on which the crankshaft 1b projects. A motor pulley 4a is mounted on the output shaft of the electric motor 4. An endless belt 6 is extended around the four pulleys 1a, 2a, 3a and 4a and an idler pulley 5.

The belt 6 runs clockwise as viewed in FIG. 1 successively passing the crankshaft pulley 1a, the idler pulley 5, the motor pulley 4a, the accessory pulley 2a and the accessory pulley 3a back to the crankshaft pulley 1a. A tension pulley 7 is pressed against a part 6a, between the crankshaft pulley 1a and the idler pulley 5, of the belt 6 to tension the belt 6. The tension pulley 7 is supported for rotation on an end part of a longer arm 9a of an L-shaped lever 9.

A hydraulic automatic tensioner 10 includes a first member 11 and a second member 12 coaxially combined with the first member so as to be axially movable relative to the first member 11. The first member 11 is connected to a fixed part of the internal combustion engine 1, and the second member 12 is connected to an end part of a shorter arm 9b of the lever 9.

The part 6a of the belt 6 is a slack side when the crankshaft pulley 1a mounted on the crankshaft 1b drives the belt 6 and is a tight side when the motor pulley 4a of the electric motor 4 drives the belt 6. The tension pulley 7 is pressed against the part 6a of the belt 6 through the L-shaped lever 9 when the hydraulic automatic tensioner 10 extends to increase the tension of the belt 6. The tension of the belt 6 decreases when the hydraulic automatic tensioner contracts.

Figure 2:
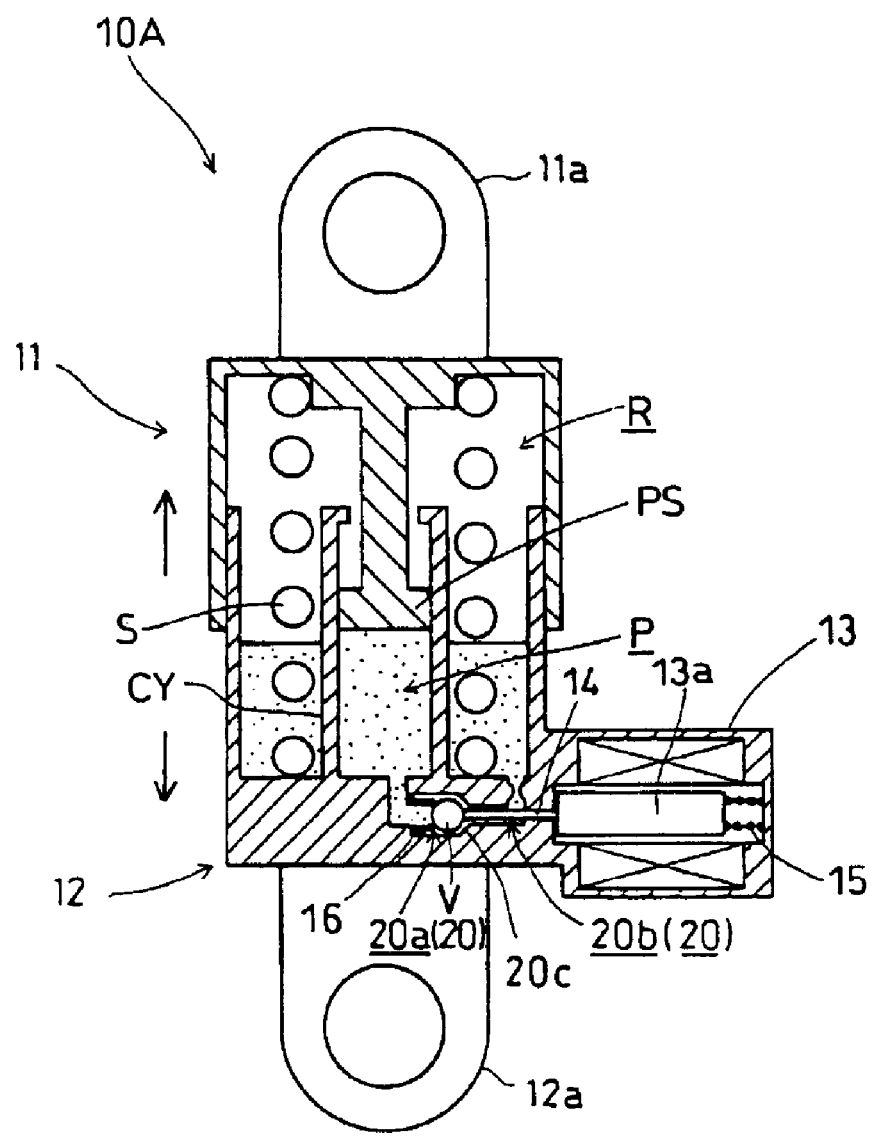
FIG. 2 is a longitudinal sectional view of a hydraulic automatic tensioner in a first embodiment of the present invention in a normal state.
Figure 18:
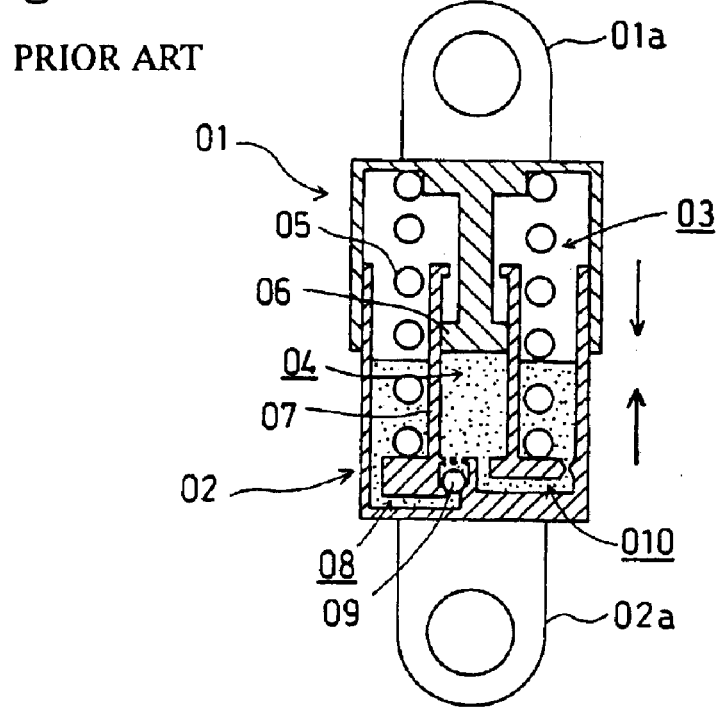
FIG. 18 is a longitudinal sectional view of a prior art hydraulic automatic tensioner.
Figure 19:
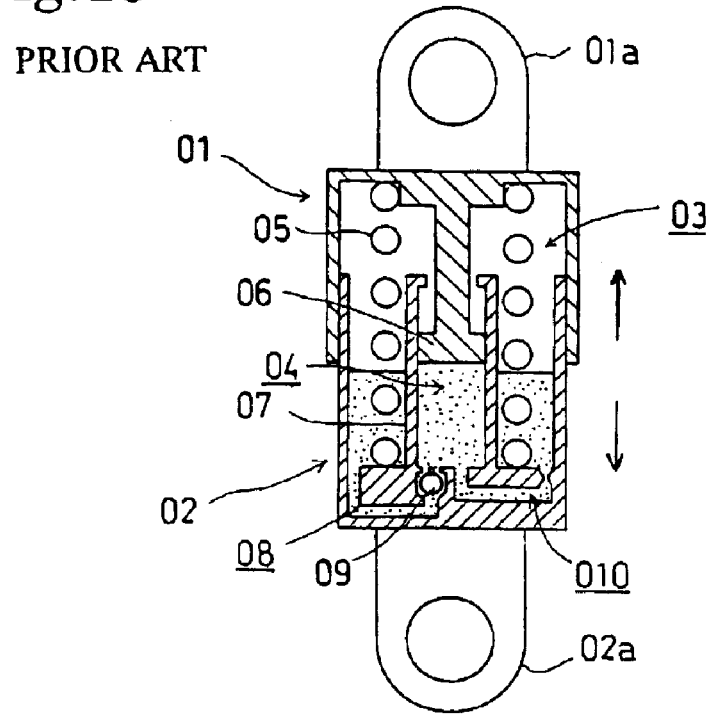
FIG. 19 is a longitudinal sectional view of the hydraulic automatic tensioner shown in FIG. 18 in a state different from that of the hydraulic automatic tensioner shown in FIG. 18.

FIG. 2 shows a hydraulic automatic tensioner 10A in a first embodiment of the present invention to be used as the hydraulic automatic tensioner 10. The hydraulic automatic tensioner 10A is the same in basic construction as the prior art hydraulic automatic tensioner 01 shown in FIGS. 18 and 19. As shown in FIG. 2, the hydraulic automatic tensioner 10A has a first member 11 having the shape of a bottomed cylinder, a second member 12 having the shape of a bottomed cylinder and coaxially combined with the first member 11 so as to be axially slidable relative to the first member 11 and to define a fluid-reservoir chamber R, and a spring S extended between the members 11 and 12 to push the members 11 and 12 away from each other. The first member 11 has a connecting lug 11a attached to the fixed part, and the second member 12 has a connecting lug 12a connected to the shorter arm 9b of the L-shaped lever 9.

The members 11 and 12 define the fluid-reservoir chamber R. A piston PS is formed integrally with the first member 11, and a cylinder CY is formed integrally with the second member 12. The piston PS is axially slidably fitted in the cylinder CY to define a pressure chamber P. Thus, the hydraulic automatic tensioner 10A is compact. The pressure chamber P filled up with a hydraulic fluid communicates with the fluid-reservoir chamber R by means of a leak passage 20 formed in an end wall of the second member 12.

The hydraulic automatic tensioner 10A is the same as the prior art hydraulic automatic tensioner 01 in those structural respects. The hydraulic automatic tensioner 10A of the present invention differs from the prior art hydraulic automatic tensioner 01 in that the hydraulic automatic tensioner 10A does not have any passages other than the leak passage 20, a control valve (check valve) V is placed in the leak passage 20, and a solenoid actuator (control device) 13 for operating the control valve V is attached to the side wall of the second member 12.

The leak passage 20 has a large-diameter section 20a on the side of the pressure chamber P, and a small-diameter section 20b on the side of the fluid-reservoir chamber R. The large-diameter section 20a serves as a valve chamber. A valve seat 20c is formed between the large-diameter section 20a and the small-diameter section 20b. The spherical valve element of the control valve V is pressed against the valve seat 20c by a spring 16. The leak passage 20 is closed when the spherical valve element of the control valve V is seated on the valve seat 20c, and is open when the valve element of the control valve V is separated from the valve seal 20c.

The solenoid actuator 13 has a plunger 13a, and an operating rod 14 is connected coaxially to the plunger 13a. The plunger 13a is pushed toward the control valve V by a spring 15 to separate the valve element of the control valve V from the valve seat 20c. The resilience of the spring 15 is higher than that of the spring 16. While the solenoid actuator 13 is deactivated, the operating rod 14 pushed toward the control valve V by the resilience of the spring 15 exceeding that of the spring 16 to open the leak passage 20 as shown in FIG. 2. When the solenoid actuator 13 is activated, i.e., when the solenoid of the solenoid actuator 13 is energized, the operating rod 14 is retracted to enable the spring 16 to press the valve element of the control valve V against the valve seat 20c to close the leak passage 20.

While the hydraulic automatic tensioner 10A thus constructed is in a normal state, the solenoid actuator 13 is deactivated, the control valve V does not function as a check valve, the leak passage 20 is open. The operation of the hydraulic automatic tensioner 10A is the same as that of the prior art hydraulic automatic tensioner 01.

When the belt 6 slackens and the tension of the belt 6 decreases, the spring S pushes the second member 12 away from the first member 11 to extend the hydraulic automatic tensioner 10A and thereby the pressure chamber P is expanded. Consequently, the hydraulic fluid flows from the fluid-reservoir chamber R through the leak passage 20 into the pressure chamber P. Thus the hydraulic automatic tensioner 10A extends against a low resistance to increase the tension of the belt 6 so that the belt 6 is tensioned properly.

When the belt 6 tightens and the tension of the belt 6 increases, the hydraulic fluid flows from the pressure chamber P through the leak passage 20 into the fluid-reservoir chamber R, and the second member 12 moves gradually toward the first member 11 against a high resistance. Thus, the hydraulic automatic tensioner 10A contracts gradually to avoid excessively tensioning the belt 6.

When the electric motor 4 operates as a starter motor to start the internal combustion engine 1, the electric motor 4 needs to exert a high torque on the stopping crankshaft 1b. Consequently, the part 6a of the belt 6 extending between the crankshaft pulley 1a and the motor pulley 4a is tightened and tensioned.

Figure 3:
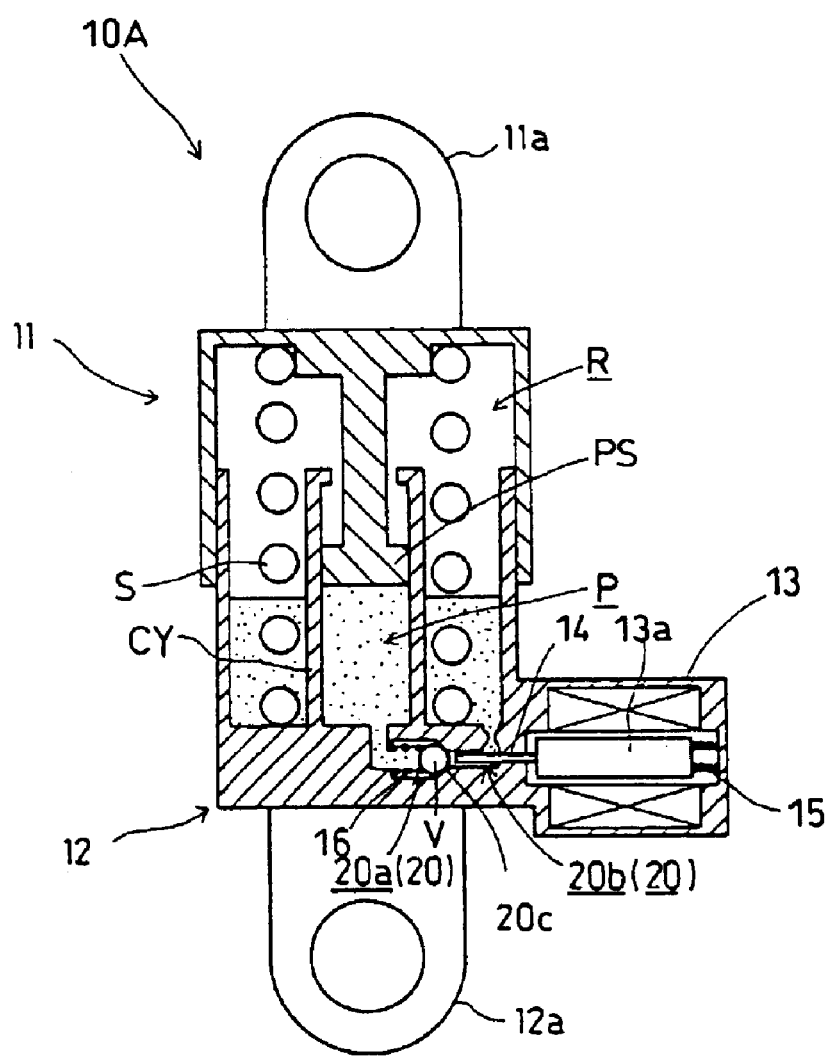
FIG. 3 is a longitudinal sectional view of the hydraulic automatic tensioner shown in FIG. 2 in a state at the start of the internal combustion engine.

In starting the internal combustion engine 1, the solenoid actuator 13 is activated to retract the operating rod 14 to permit the valve element of the control valve V to be seated on the valve seat 20c so that the control valve V functions as a check valve. Consequently, the leak passage 20 is closed to disconnect the pressure chamber P perfectly from the fluid-reservoir chamber R as shown in FIG. 3 and thereby the hydraulic automatic tensioner 10A is restrained from contraction, i.e., the second member 12 is restrained from moving toward the first member 11. Thus, a high tension is applied to the belt 6 to transmit power securely from the electric motor 4 to the crankshaft 1b to start the internal combustion engine 1 with reliability.

The crankshaft pulley 1a mounted on the crankshaft 1b drives the belt 6 after the internal combustion engine 1 has been started and, consequently, the part 6a, extending between the crankshaft pulley 1a and the motor pulley 4a is slackened suddenly. Since the axial movement of the second member 12 toward the first member 11 is obstructed to inhibit the contraction of the hydraulic automatic tensioner 10A and the hydraulic automatic tensioner 10A is ready to extend immediately after the belt 6 starts slackening, the second member is moved away rapidly from the first member 11 and the hydraulic automatic tensioner 10A starts extending immediately after the internal combustion engine 1 has started to tension the belt 6 properly. Thus, the belt 6 does not slip relative to the pulleys and is always able to transmit power securely.

Thus, the solenoid actuator 13 is activated to use the control valve V as a check valve in starting the internal combustion engine 1 to deal properly with the sudden variation of the tension of the belt 6 in a period before and after the start of the internal combustion engine 1. The solenoid actuator 13 is deactivated to keep the control valve V open for the normal operation of the hydraulic automatic tensioner 10A after the internal combustion engine 1 has been started, and power can be always surely transmitted. Since the electric motor capable of operating also as a generator is used as a starter motor, the internal combustion engine 1 does not need any additional generator as an engine accessory and can be formed in compact construction.

A hydraulic automatic tensioner 10B in a second embodiment of the present invention will be described with reference to FIGS. 4 and 5. The hydraulic automatic tensioner 10B is substantially the same in construction as the hydraulic automatic tensioner 10A in the first embodiment, except that the hydraulic automatic tensioner 10B is provided additionally with a connecting passage 18, and includes additionally a check valve 19 placed in the connecting passage 18. Parts of the hydraulic automatic tensioner 10B like or corresponding to those of the hydraulic automatic tensioner 10A are designated by the same reference characters and the description thereof will be omitted.

Figure 4:
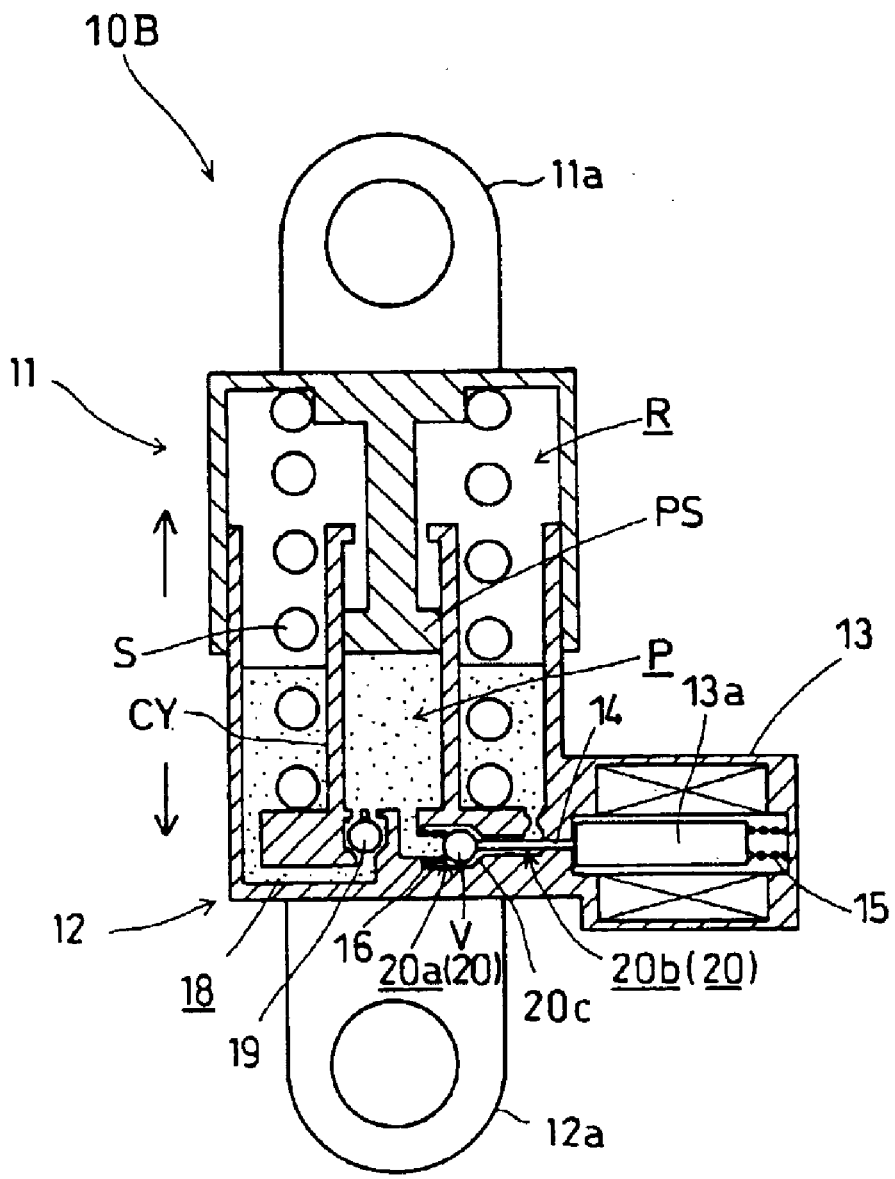
FIG. 4 is a longitudinal sectional view of a hydraulic automatic tensioner in a second embodiment of the present invention in a normal state.
Figure 5:
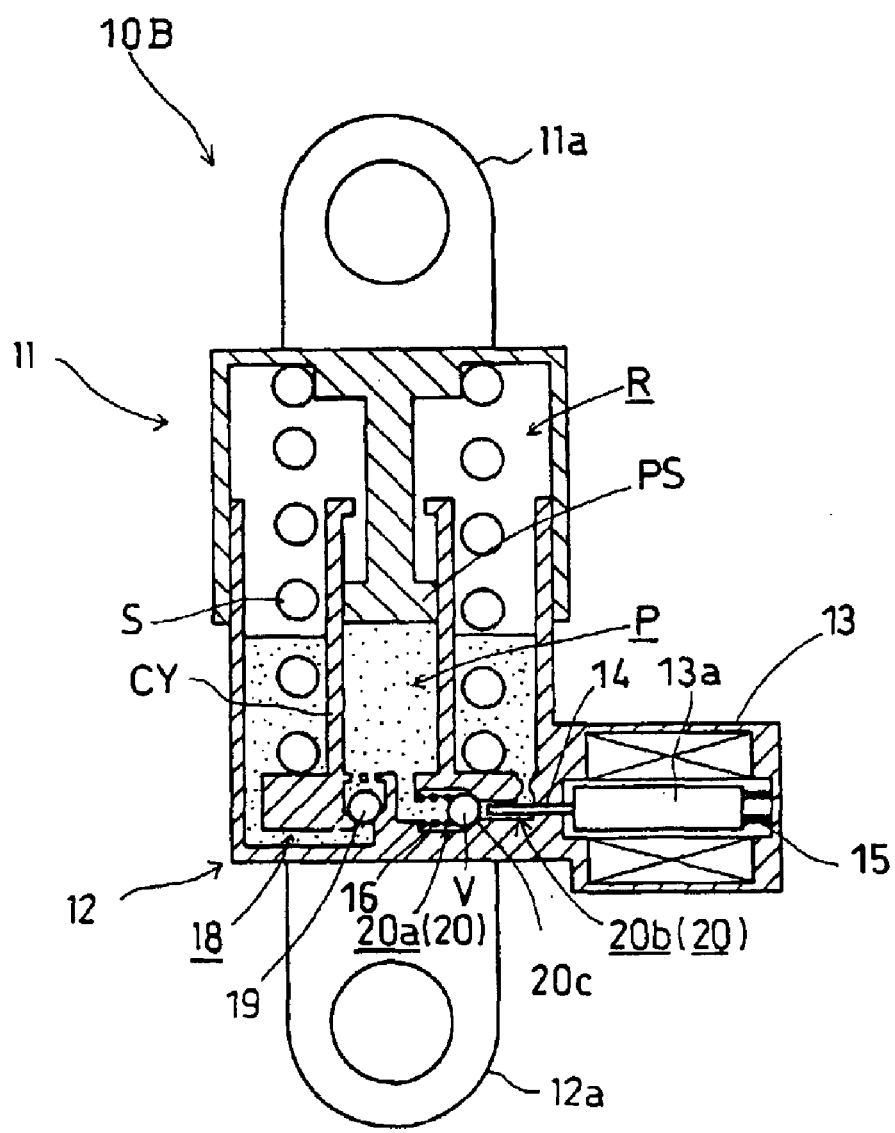
FIG. 5 is a longitudinal sectional view of the hydraulic automatic tensioner shown in FIG. 4 in a state at the start of the internal combustion engine.

Referring to FIG. 4, a pressure chamber P is connected to a fluid-reservoir chamber R for storing a hydraulic fluid by the connecting passage 18 formed in an end wall of a second member 12. The check valve 19 placed in the connecting passage 18 permits the flow of the hydraulic fluid from the fluid-reservoir chamber R into the pressure chamber P and inhibits the reverse flow.

When the tension of the belt 6 decreases, a spring S pushes the second member 12 away from a first member 11 as shown in FIG. 4, and the hydraulic automatic tensioner 10B extends expanding the pressure chamber P. Consequently, the check valve 19 opens, the hydraulic fluid flows at a high flow rate through the connecting passage 18 and a leak passage 20 from the fluid-reservoir chamber R into the pressure chamber P, and hence the hydraulic automatic tensioner 10B extends quickly against a low resistance to tension the belt 6 properly.

When the tension of the belt 6 increases, pressure in the pressure chamber P increases, the check valve 19 inhibits the flow of the hydraulic fluid from the pressure chamber P through the connecting passage 18 into the fluid-reservoir chamber R, and the hydraulic fluid is allowed to flow gradually from the pressure chamber P through the leak passage 20 into the fluid-reservoir chamber R. Consequently, the hydraulic automatic tensioner 10B contracts against a high resistance so that the belt 6 may not be excessively tensioned.

In starting the internal combustion engine 1, a solenoid actuator 13 is activated to retract an operating rod 14 so that the valve element of a control valve V is seated on a valve seat 20c to close the leak passage 20. Consequently, the pressure chamber P of the hydraulic automatic tensioner 10B is sealed perfectly as shown in FIG. 5 when the belt 6 is tightened and the second member 12 is unable to move axially toward the first member 11. Thus, the high tension of the belt 6 is maintained, the power of the electric motor 4 serving also as a generator can be surely transmitted to the crankshaft 1b, and thereby the internal combustion engine 1 can be started with reliability.

Since the axial movement of the second member 12 toward the first member 11 is obstructed to inhibit the contraction of the hydraulic automatic tensioner 10B, and the hydraulic automatic tensioner 10B is ready to extend freely, the second member 12 is moved quickly away from the first member 11 upon the start of the internal combustion engine 1, so that the belt 6 is tensioned properly, does not slip relative to the pulleys, and is able to transmit power with reliability.

Figure 6:
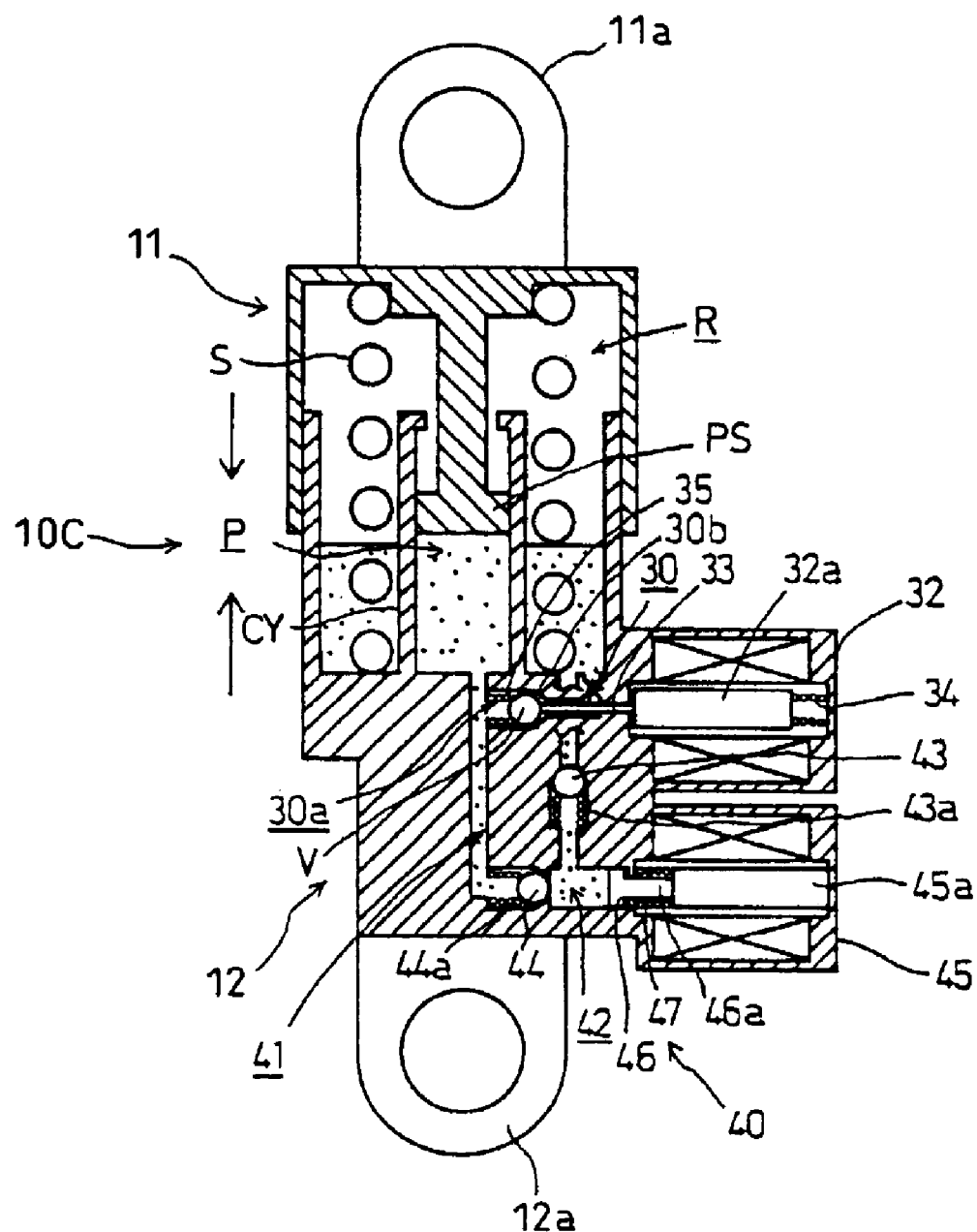
FIG. 6 is a longitudinal sectional view of a hydraulic automatic tensioner in a third embodiment of the present invention in a normal state.
Figure 7:
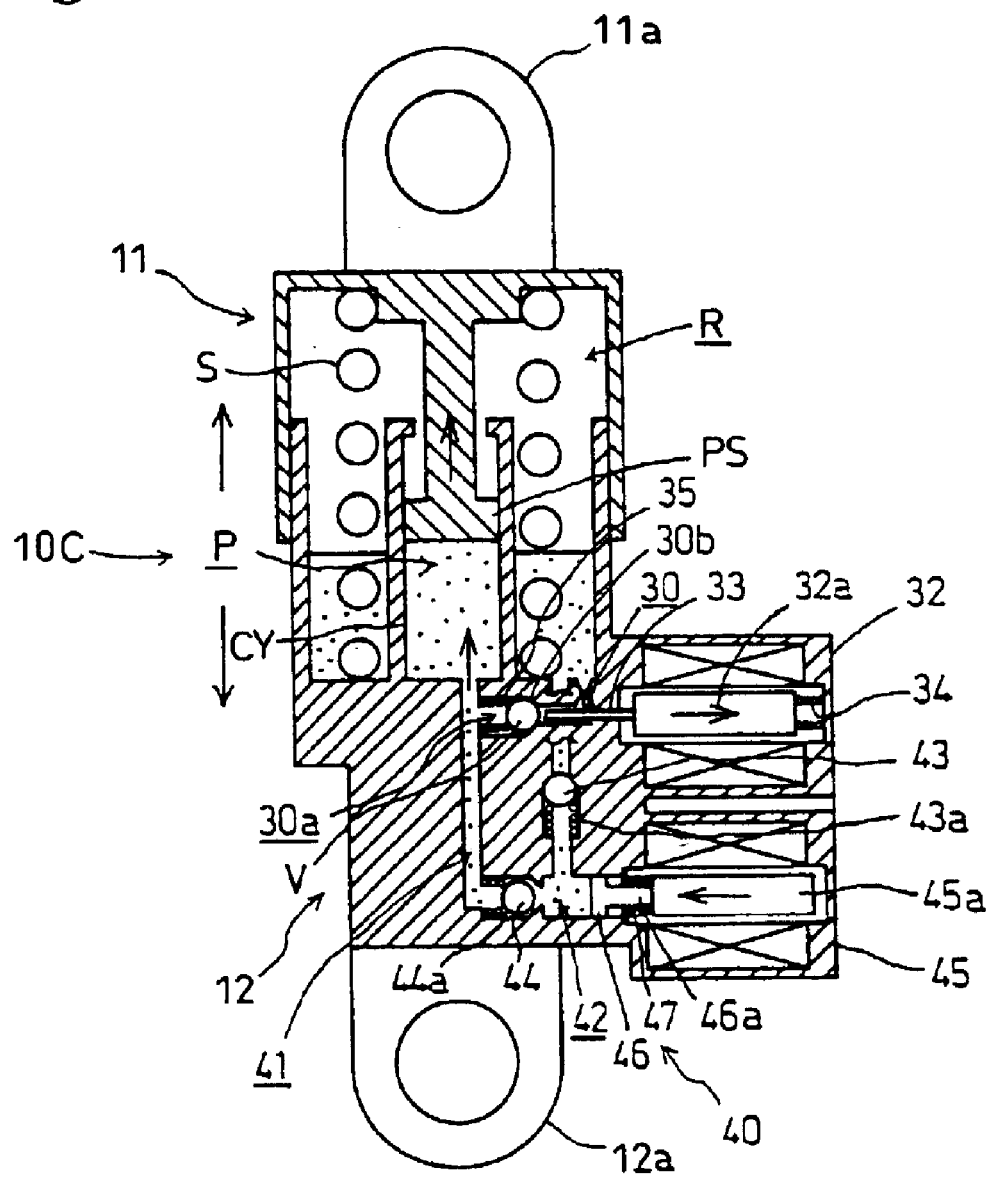
FIG. 7 is a longitudinal sectional view of the hydraulic automatic tensioner shown in FIG. 6 in a state at the start of the internal combustion engine.

FIGS. 6 and 7 show a hydraulic automatic tensioner 10C in a third embodiment of the present invention.

The hydraulic automatic tensioner 10C has a first member 11 having the shape of a bottomed cylinder, a second member 12 having the shape of a bottomed cylinder and coaxially combined with the first member 11 so as to be axially slidable relative to the first member 11 and to define a fluid-reservoir chamber R, and a spring S extended between the members 11 and 12 to push the members 11 and 12 away from each other. The first member 11 has a connecting lug 11a attached to a fixed part, and the second member 12 has a connecting lug 12a connected to a movable member.

The members 11 and 12 define the fluid-reservoir chamber R. A piston PS is formed integrally with the first member 11, and a cylinder CY is formed integrally with the second member 12. The piston PS is axially slidably fitted in the cylinder CY to define a pressure chamber P. Thus, the hydraulic automatic tensioner 10C is compact. The pressure chamber P filled up with a hydraulic fluid communicates with the fluid-reservoir chamber R by means of a leak passage 30 formed in an end wall of the second member 12.

A valve chamber 30a is formed in a part, on the side of the pressure chamber P, of the leak passage 30, a valve seat 30b is formed in a part, on the side of the fluid-reservoir chamber R, of the leak passage 30. The spherical valve element of a control valve V is pressed against the valve seat 30b by a spring 35. The leak passage 30 is closed when the spherical valve element of the control valve V is seated on the valve seat 30b, and is open when the valve element of the control valve V is separated from the valve seal 30b.

A solenoid actuator 32 is attached to the side wall of the second member 12. The solenoid actuator 32 has a plunger 32a, and an operating rod 33 is connected coaxially to the plunger 32a. The plunger 32a is pushed toward the control valve V by a spring 34 to separate the valve element of the control valve V from the valve seat 30b. The resilience of the spring 34 is higher than that of the spring 35. While the solenoid actuator 32 is deactivated, the operating rod 33 pushed toward the control valve V by the resilience of the spring 35 exceeding that of the spring 34 to open the leak passage 30 as shown in FIG. 6.

When the solenoid actuator 32 is activated, the operating rod 33 pushing the valve element of the control valve V is retracted to make the control valve V function as a check valve; the valve element of the control valve V is pressed against the valve seat 30b by the spring 35 to close the leak passage 30 as shown in FIG. 7.

The hydraulic automatic tensioner 10C is provided with a pressurizing mechanism 40. The second member 12 of the hydraulic automatic tensioner 10C is provided, in addition to the leak passage 30, with a pressurizing passage 41 extending under the leak passage 30 between the pressure chamber P and the fluid-reservoir chamber R.

The pressurizing passage 41 is provided with a pressurizing chamber 42. A check valve 43 that permits only the flow of the hydraulic fluid from the fluid-reservoir chamber R into the pressure chamber P is placed in a section, on the side of the fluid-reservoir chamber R with respect to the pressurizing chamber 42, of the pressurizing passage 41. The check valve 43 has a valve element pressed against a valve seat by a spring 43a. A check valve 44 that permits only the flow of the hydraulic fluid from the pressurizing chamber 42 of the pressurizing passage 41 into the pressure chamber P is placed in a part, on the side of the pressure chamber P with respect to the pressurizing chamber 42, of the pressurizing passage 41. The check valve 44 has a valve element pressed against a valve seat by a spring 44a.

A solenoid actuator 45 provided with a plunger 45a is attached to the side wall of the second member 12. A piston 46 formed integrally with a piston rod 46a is slidably fitted in the pressurizing chamber 42. The piston rod 46a is connected coaxially to the plunger 45a of the solenoid actuator 45. The plunger 45a is pushed in a direction to retract the piston rod 46a by a spring 47.

When the solenoid actuator 45 of the pressurizing mechanism 40 is activated to advance the piston 46 into the pressurizing chamber 42 so that the pressure in the pressurizing chamber 42 increases, the check valve 44 opens to connect the pressurizing chamber 42 to the pressure chamber P, so that the pressure in the pressure chamber P is raised. When the solenoid actuator 45 is deactivated, the piston 46 is retracted, the check valve 44 closes, the check valve 43 opens and, consequently, the hydraulic fluid flows from the fluid-reservoir chamber R into the pressurizing chamber 42 as shown in FIG. 7.

When the hydraulic automatic tensioner 10C is in a normal state, where the solenoid actuators 32 and 45 are deactivated, the control valve V is open to open the leak passage 30, and the check valves 43 and 44 are closed to close the pressurizing passage 41.

Thus, when the belt 6 slackens with the hydraulic automatic tensioner 10C in the normal state, the second member 12 is moved away from the first member 11 by the spring S, the pressure chamber P expands, the control valve V opens the leak passage 30 and the hydraulic fluid flows at a high flow rate from the fluid-reservoir chamber R into the pressure chamber P. Consequently, the second member 12 is able to move away from the first member 11 quickly against a low resistance to extend the hydraulic automatic tensioner 10C to tension the belt 6 properly.

When the electric motor 4 operates as a starter motor to start the internal combustion engine 1, the electric motor 4 needs to exert a high torque on the stopping crankshaft 1b. Consequently, the part 6a of the belt 6 extending between the crankshaft pulley 1a and the motor pulley 4a is tightened and tensioned. Therefore, it is possible that the motor pulley 1a slips relative to the belt 6.

In starting the internal combustion engine 1 the hydraulic automatic tensioner 10C is extended to apply a high tension to the belt 6 beforehand; the solenoid actuator 32 is activated to make the control valve V function as a check valve as shown in FIG. 7 so that the leak passage 30 is closed and, subsequently, the solenoid actuator 45 is activated to open the check valve 44 by advancing the piston 46 so that the pressure in the pressure chamber P is raised. Consequently, the second member 12 is moved away from the first member 11 to extend the hydraulic automatic tensioner 10C.

Power supply to the electric motor 4 is controlled such that power is supplied to the electric motor 4 to start the electric motor 4 to drive the belt 6 by the motor pulley 4a a proper lag time after the belt 6 has been thus tensioned.

Since the motor pulley 4a starts rotating after the high tension has been applied to the belt 6, the tension of the belt 6 is increased further when the motor 4 is started, the friction between he belt 6 and the motor pulley 4a increases. Consequently, the motor pulley 4a is prevented from slipping relative to the belt 6, the power of the electric motor 4 can be surely transmitted to the crankshaft 1b, so that the internal combustion engine 1 can be smoothly started.

Upon the detection of the complete start of the internal combustion engine 1, power supply to the electric motor 4 is stopped, the solenoid actuator 32 is deactivated to nullify the flow stopping function of the control valve V so that the hydraulic fluid is able to flow through the leak passage 30, and then the solenoid actuator 45 is deactivated.

The crankshaft 1b mounted with the crankshaft pulley 1a rotates after the internal combustion engine has started to drive the belt 6. Therefore, the part 6a, between the crankshaft pulley 1a and the motor pulley 4a, of the belt 6 slackens suddenly.

Since second member 12 is restrained from moving toward the first member 11, the hydraulic automatic tensioner 10C is unable to contract, and the pressure chamber P is pressurized to extend the hydraulic automatic tensioner 10C immediately before the belt 6 starts slackening, the belt 6 is able to slacken slightly after the internal combustion engine 1 has started. Since the leak passage 30 is open at this stage, the second member 12 is moved quickly away from the first member 11. Consequently, the belt 6 can be properly tensioned, does not slip relative to the pulleys and is able to transmit power securely.

Thus, the hydraulic automatic tensioner 10C is able to cope precisely with the sudden change of the tension of the belt 6 in starting the internal combustion engine 1 by closing the control valve V and pressurizing the pressure chamber P by the pressurizing mechanism 40 before starting the internal combustion engine 1.

Since the pressure in the pressure chamber P is increased by the pressurizing mechanism 40 to apply a high tension to the belt 6 while the internal combustion engine 1 is in a special operating mode, such as an engine-starting mode, the belt 6 may be tensioned at the minimum permissible tension while the internal combustion engine 1 is operating in a normal operating mode.

Thus, loads on the bearings of the engine accessories, such as the water pump 2, the compressor 3 of an air conditioner and the electric motor 4, are reduced, the belt 6 does not need to be a belt of a large load capacity, and the power transmitting mechanism is a rational belt-drive transmission mechanism.

A hydraulic automatic tensioner 10D in a fourth embodiment of the present invention will be described with reference to FIGS. 8 and 9.

The hydraulic automatic tensioner 10D is substantially the same in construction as the hydraulic automatic tensioner 10C in the third embodiment, except that the hydraulic automatic tensioner 10D is provided additionally with a connecting passage 28, and includes additionally a check valve 29 placed in the connecting passage 28. Parts of the hydraulic automatic tensioner 10D like or corresponding to those of the hydraulic automatic tensioner 10C are designated by the same reference characters and the description thereof will be omitted.

Figure 8:
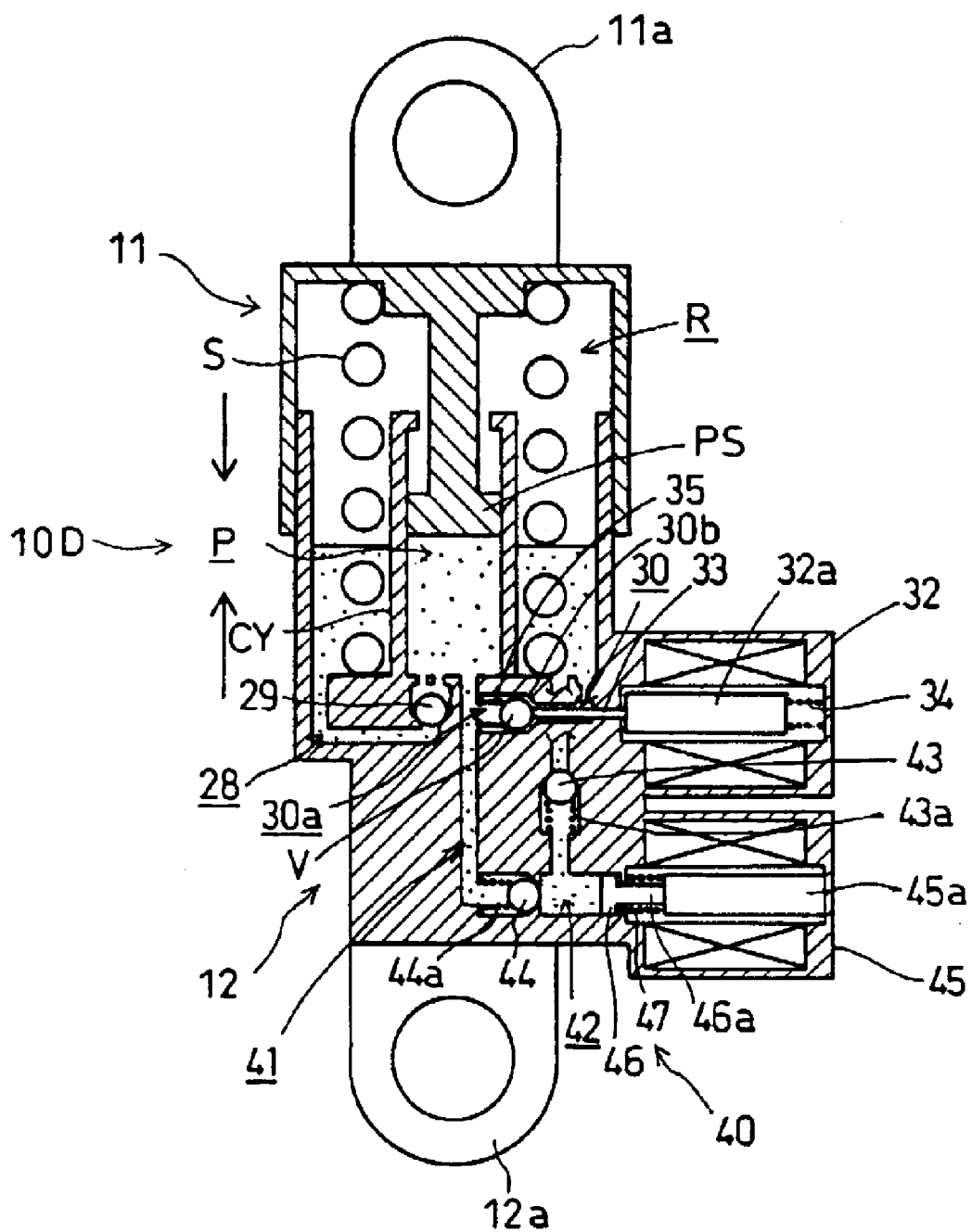
FIG. 8 is a longitudinal sectional view of a hydraulic automatic tensioner in a fourth embodiment of the present invention in a normal state.

Referring to FIG. 8, a pressure chamber R is connected to a fluid-reservoir chamber R for storing a hydraulic fluid by the connecting passage 28 formed in an end wall of a second member 12. The check valve 29 placed in the connecting passage 18 permits the flow of the hydraulic fluid from the fluid-reservoir chamber R into the pressure chamber P and inhibits the reverse flow.

When the belt 6 slackens and the tension of the belt 6 decreases, a spring S pushes the second member 12 away from a first member 11 as shown in FIG. 8, and the hydraulic automatic tensioner 10D extends expanding the pressure chamber P. Consequently, the check valve 29 opens, the hydraulic fluid flows at a high flow rate through the connecting passage 28 and a leak passage 30 from the fluid-reservoir chamber R into the pressure chamber P, and hence the hydraulic automatic tensioner 10D extends quickly against a low resistance to tension the belt 6 properly.

When the tension of the belt 6 increases, pressure in the pressure chamber P increases, the check valve 29 inhibits the flow of the hydraulic fluid from the pressure chamber P through the connecting passage 28 into the fluid-reservoir chamber R, and the hydraulic fluid is allowed to flow gradually from the pressure chamber P through the leak passage 30 into the fluid-reservoir chamber R. Consequently, the hydraulic automatic tensioner 10D contracts against a high resistance so that the belt 6 may not be excessively tensioned.

Figure 9:
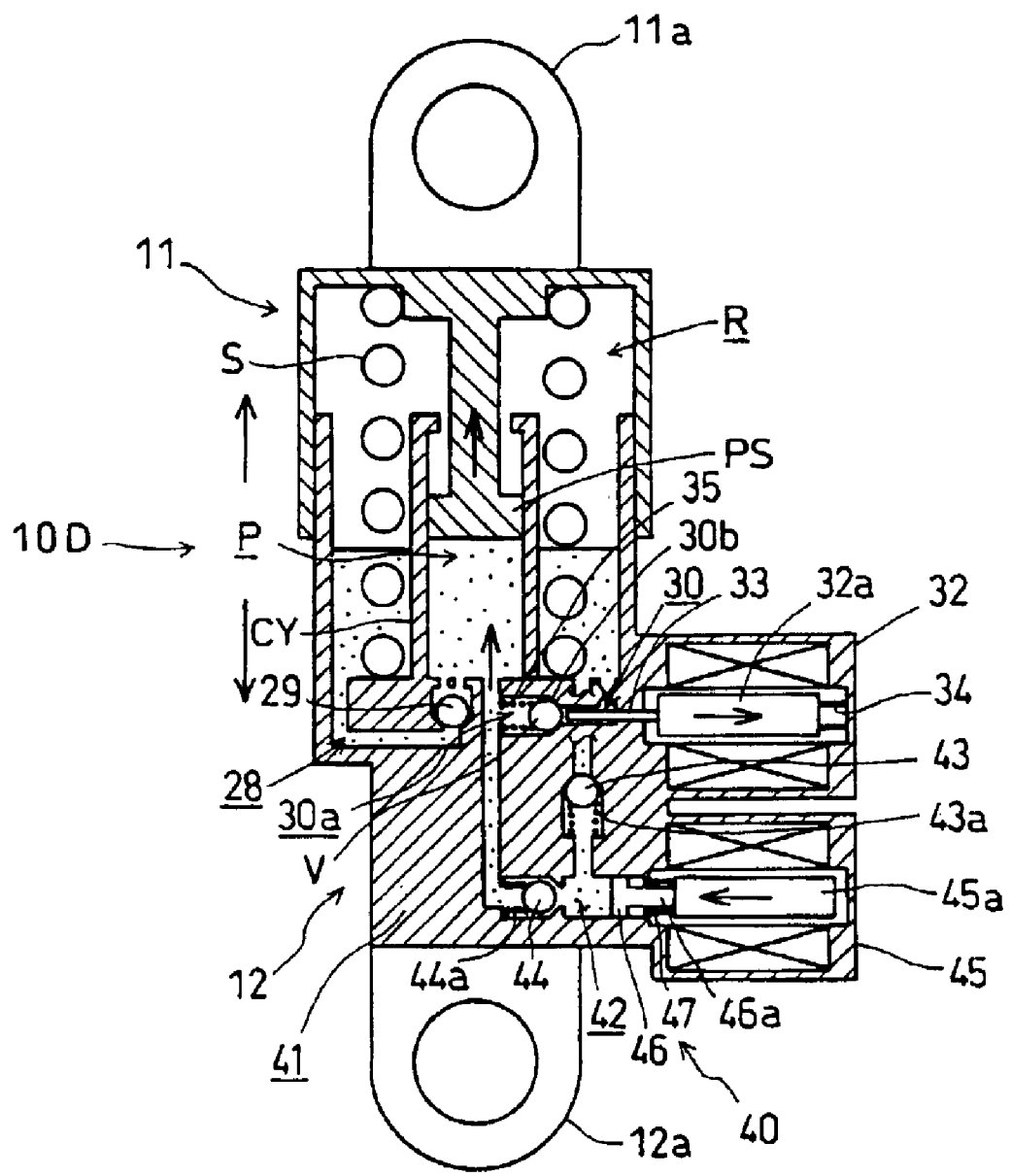
FIG. 9 is a longitudinal sectional view of the hydraulic automatic tensioner shown in FIG. 8 in a state at the start of the internal combustion engine.

In starting the internal combustion engine 1, a solenoid actuator 32 is activated to make the control valve V function as a check valve as shown in FIG. 9 so that the leak passage 30 is closed and, subsequently, a solenoid actuator 45 is activated to open a check valve 44 by advancing a piston 46 so that the pressure in the pressure chamber P is raised, and the second member 12 is moved away from the first member 11 to extend the hydraulic automatic tensioner 10D to pressurize the pressure chamber P before actuating the electric motor 4 to start the internal combustion engine 1. Thus, a high tension can be applied to the belt 6 before actuating the electric motor 4 to start the internal combustion engine 1.

Since the motor 4 is actuated after the high tension has been applied to the belt 6, the tension of the belt 6 is increased further when the motor 4 is started, the friction between he belt 6 and the motor pulley 4a increases. Consequently, the motor pulley 4a is prevented from slipping relative to the belt 6, the power of the electric motor 4 can be surely transmitted to the crankshaft 1b, so that the internal combustion engine 1 can be started with reliability.

A hydraulic automatic tensioner 10E in a fifth embodiment of the present invention will be described with reference to FIGS. 10 and 11.

The hydraulic automatic tensioner 10E is provided with a pressurizing mechanism 60 having a pressurizing passage 61 serving also as a connecting passage corresponding to the connecting passage 28 of the hydraulic automatic tensioner 10D. The hydraulic automatic tensioner 10E is the same in other respects as the hydraulic automatic tensioner 10D, and hence parts of the hydraulic automatic tensioner 10E like or corresponding to those of the hydraulic automatic tensioner 10D are designated by the same reference characters and the description thereof will be omitted.

The pressurizing passage 61 serving also as a connecting passage corresponding to the connecting passage 28 of the hydraulic automatic tensioner 10D is formed in the end wall of a second member 12 so as to connect a pressure chamber P and a fluid-reservoir chamber R. The pressurizing passage 61 is provided with a pressurizing chamber 62. A check valve 63 that permits only the flow of the hydraulic fluid from the fluid-reservoir chamber R into the pressure chamber P is placed in a section, on the side of the fluid-reservoir chamber R with respect to the pressurizing chamber 62, of the pressurizing passage 61. The check valve 63 has a valve element pressed against a valve seat by a spring 63a. A check valve 64 that permits only the flow of the hydraulic fluid from the pressurizing chamber 62 of the pressurizing passage 61 into the pressure chamber P is placed in a part, on the side of the pressure chamber P with respect to the pressurizing chamber 62, of the pressurizing passage 61. The check valve 64 has a valve element pressed against a valve seat by a spring 64a.

A solenoid actuator 65 provided with a plunger 65a is attached to the side wall of the second member 12. A piston 66 formed integrally with a piston rod 66a is slidably fitted in the pressurizing chamber 62. The piston rod 66a is connected coaxially to the plunger 65a of the solenoid actuator 65. The plunger 65a is pushed in a direction to retract the piston rod 66a by a spring 67.

Figure 10:
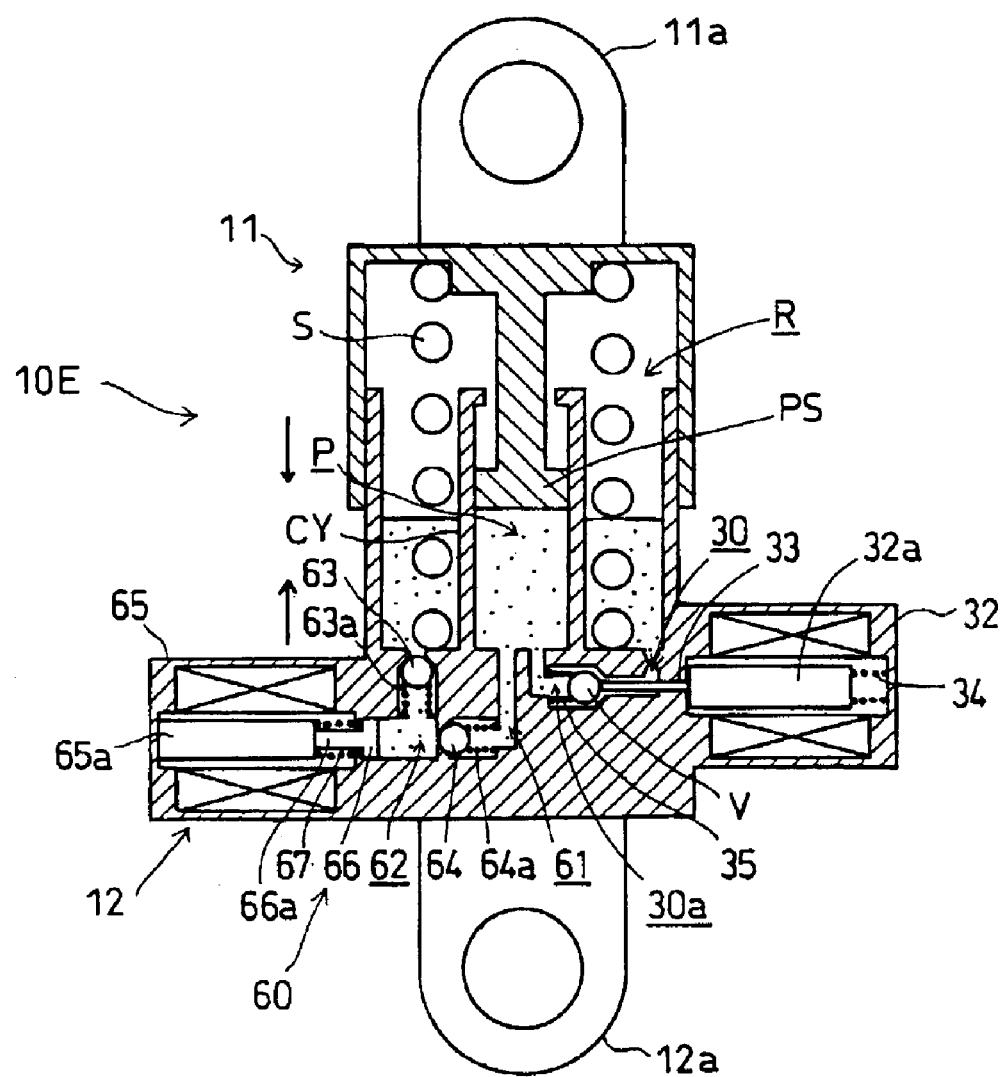
FIG. 10 is a longitudinal sectional view of a hydraulic automatic tensioner in a fifth embodiment of the present invention in a normal state.

When the solenoid actuator 65 of the pressurizing mechanism 60 is deactivated, the piston rod 66a is retracted by the spring 67 as shown in FIG. 10, and the check valves 63 and 64 placed in the pressurizing passage 61 permits the flow of the hydraulic fluid from the fluid-reservoir chamber R into the pressure chamber P and inhibits the reverse flow.

When the hydraulic automatic tensioner 10E is in a normal state, where a solenoid actuators 32 and the solenoid actuator 65 are deactivated, a control valve V is open to open a leak passage 30, and the operation of the hydraulic automatic tensioner is the same as that of the hydraulic automatic tensioner 10D.

Figure 11:
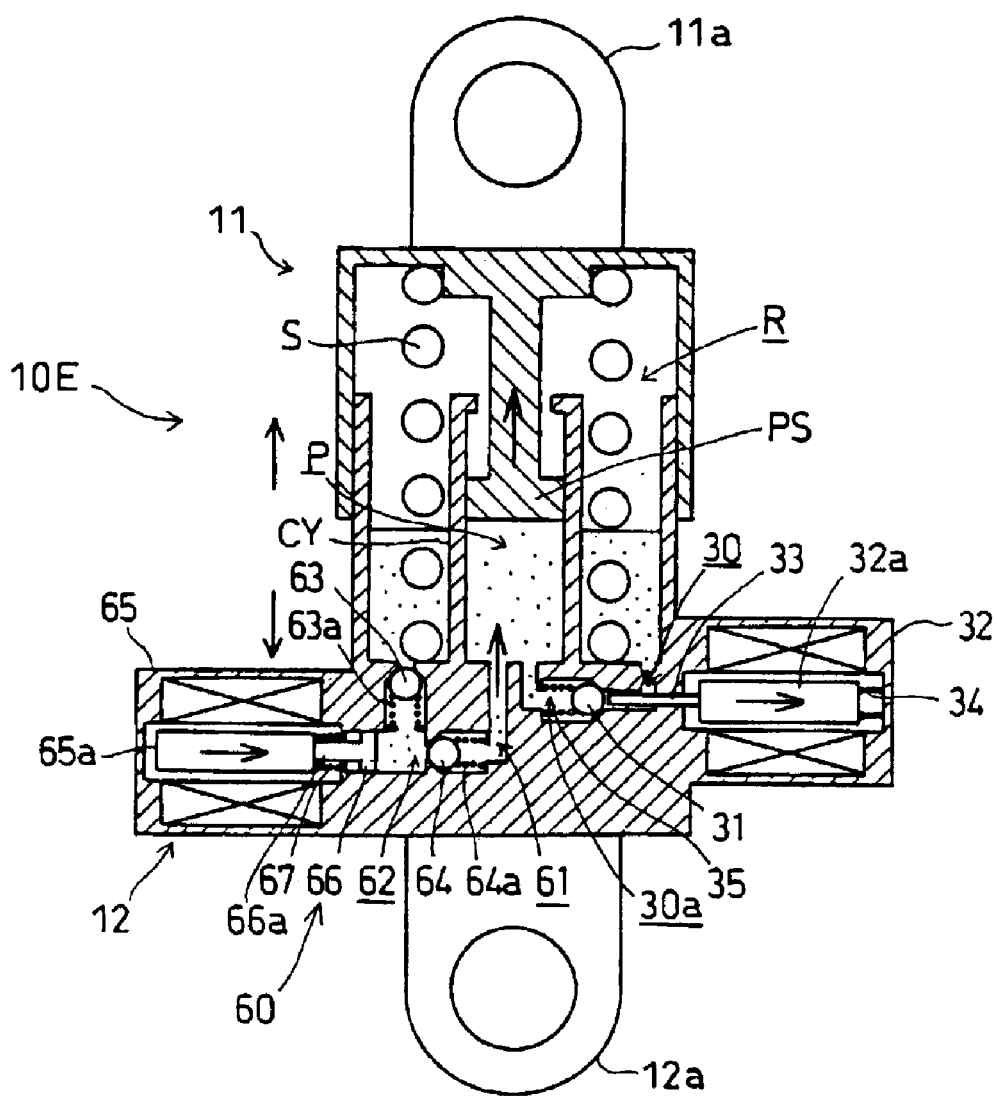
FIG. 11 is a longitudinal sectional view of the hydraulic automatic tensioner shown in FIG. 10 in a state at the start of the internal combustion engine.

In starting the internal combustion engine 1 the hydraulic automatic tensioner 10E is extended to apply a high tension to the belt 6 beforehand; the solenoid actuator 32 is activated to make the control valve V function as a check valve to close the leak passage 30 as shown in FIG. 11 and, subsequently, the solenoid actuator 65 is activated to open the check valve 64 by advancing the piston 66 so that the pressure in the pressure chamber P is raised before actuating the electric motor 4. Consequently, the second member 12 is moved away from the first member 11 to extend the hydraulic automatic tensioner 10E and thereby a high tension is applied to the belt 6 before the electric motor 4 is actuated. Then, the electric motor 4 is actuated to drive the belt 6 securely and the internal combustion engine 1 can be smoothly started.

Other operations and effects of the hydraulic automatic tensioner 10E are the same as those of the hydraulic automatic tensioner 10D. Since the pressurizing passage 61 of the pressurizing mechanism 60 of the hydraulic automatic tensioner 10E serves also as the connecting passage corresponding to the connecting passage 28 of the hydraulic automatic tensioner 10D, the hydraulic automatic tensioner 10E is more compact and lightweight than the hydraulic automatic tensioner 10D.

The pressurizing mechanisms of the foregoing embodiments employ the solenoid actuators as driving devices, and the tension of the belt, i.e., the transmission member, can be regulated by the inexpensive mechanism. The solenoid actuators may be linear solenoid actuators. Linear solenoid actuators enable the adjustment of the level of pressurization according to the operating condition and accurate tension adjustment.

A hydraulic automatic tensioner 10F in a sixth embodiment of the present invention will be described with reference to FIGS. 12 to 14.

The hydraulic automatic tensioner 10F includes an upper first member 11 having the shape of a bottomed cylinder, a lower second member 12 having the shape of a bottomed cylinder, and a pressurizing mechanism 90 combined with the first member 11. The pressuring mechanism 90 includes a crankshaft 93 disposed in an upper part of the first member 11 to move a piston 92 vertically. A base plate 91 having the shape of a disk is axially slidably fitted in the first member 11 and is provided integrally with a piston rod 92a projecting down from a central part of the base plate 92, and a piston PS formed on the lower end of the piston rod 92a.

The crankshaft 93 is supported in a space between the base plate 91 and the end wall of the first member for rotation in bearings 71b and 71c projecting from the inner surface of the end wall of the first member 11. A connecting rod 94 has one end pivotally connected to a crank of the crankshaft 93 by a crankpin 93a, and the other end pivotally connected to a central projection 95 formed on the upper surface of the base plate 91 by a pin 95. Thus, the base plate 91 integrally provided with the piston PS is connected to the crankshaft 93 by the connecting rod 94. A motor 96 included in the pressurizing mechanism 90 is supported on the side wall of the first member 11. A drive gear 97 mounted on the drive shaft 96a of the motor 96 is in mesh with a gear 98 mounted on an end part of the crankshaft 93 to form a reduction gear mechanism.

The motor 96 drives the crankshaft 93 fir rotation through the gears 97 and 98 to move the base plate 91 and the piston 92 together vertically through the connecting rod 94.

The second member 12 is coaxially fitted in the first member 11 so as to be slidable relative to the first member 11. A fluid-reservoir chamber R is formed between the base plate 91 and the second member 12. The piston PS is slidably fitted in a cylinder CY disposed in the fluid-reservoir chamber R to form a pressure chamber P. A spring S is extended between the base plate 91 and the end wall of the second member 12 in the fluid-reservoir chamber R to push the second member 12 away from the base plate 91.

A connecting passage 78 and a leak passage 80 provided with an orifice are formed in the end wall of the second member 12 to connect the pressure chamber P filled with a hydraulic fluid and the fluid-reservoir chamber R for storing the hydraulic fluid. A check valve 79 is placed in the connecting passage 78 to permit the flow of the hydraulic fluid from the fluid-reservoir chamber R into the pressure chamber P and to inhibit the reverse flow. A control valve V is placed in the leak passage 80 and is operated for opening and closing through an operating rod 83 by a solenoid actuator 82. This arrangement of the parts associated with the connecting passage 78 and the leak passage 80 is the same as that of the corresponding parts of the hydraulic automatic tensioner in the foregoing embodiment.

Figure 12:
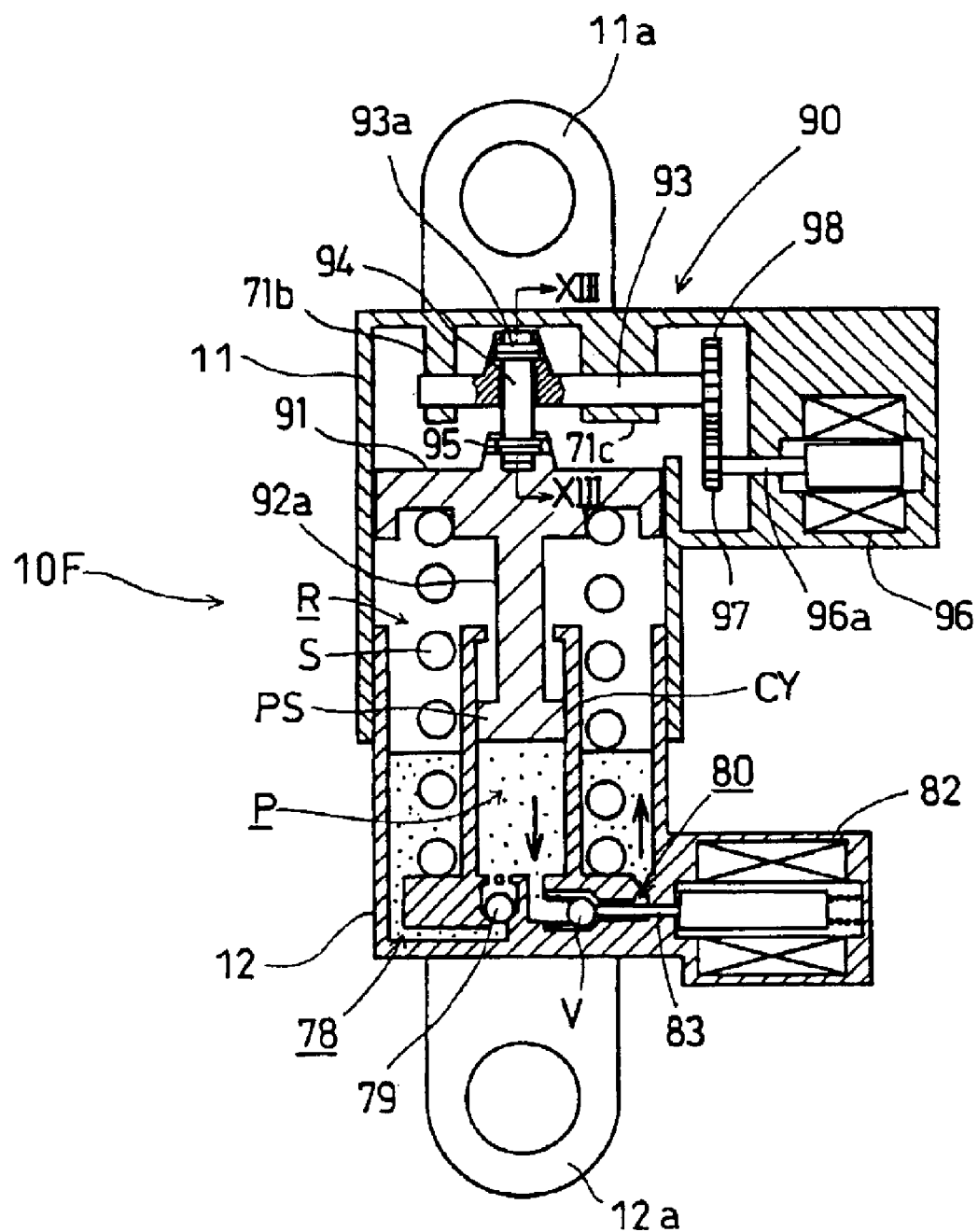
FIG. 12 is a longitudinal sectional view of a hydraulic automatic tensioner in a sixth embodiment of the present invention in a normal state.
Figure 13:
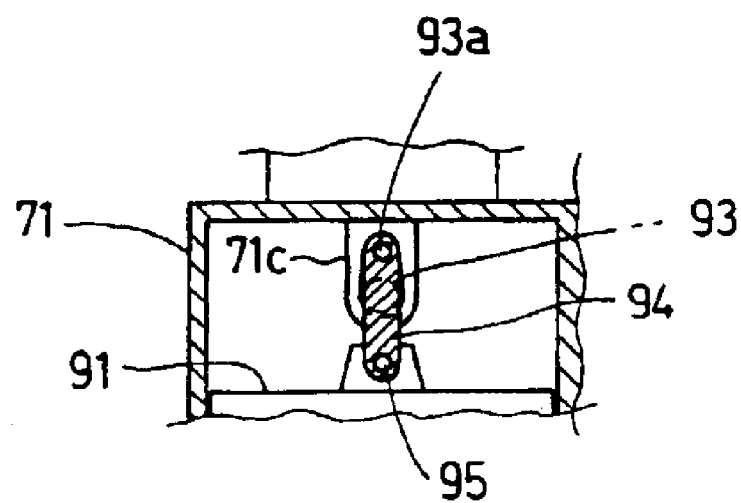
FIG. 13 is a fragmentary sectional view taken on line XIII—XIII in FIG. 12.

While the hydraulic automatic tensioner 10F is in a normal operating state, the motor 96 is not energized, the crankshaft 93 is held at an angular position where the base plate 91 is at its top position closest to the end wall of the first member 11 as shown in FIG. 12, and the solenoid actuator 82 is deactivated to make the control valve V open the leak passage 80. The operation of the hydraulic automatic tensioner 10F in the normal operating state is the same as that of the foregoing hydraulic automatic tensioner.

Figure 14:
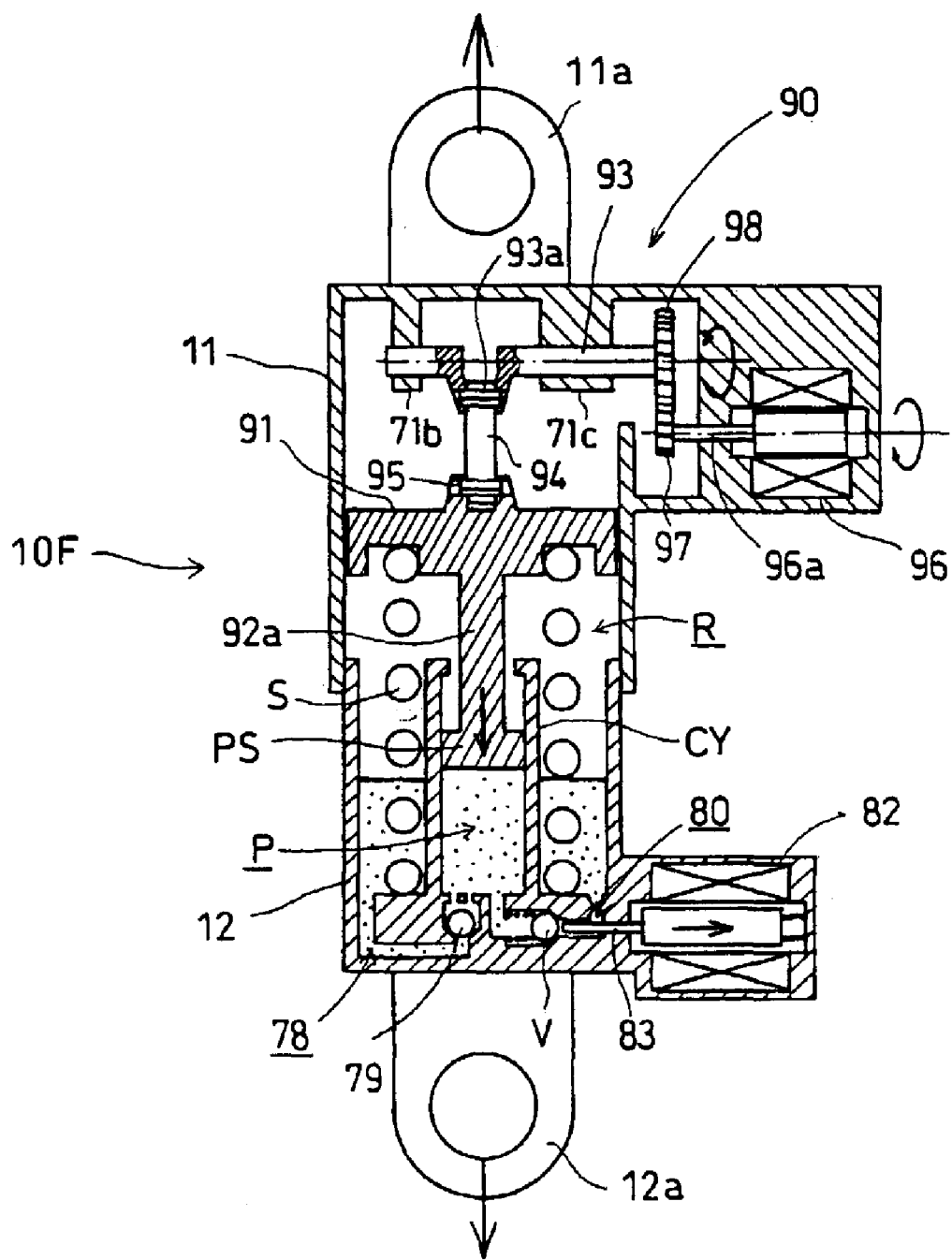
FIG. 14 is a longitudinal sectional view of the hydraulic automatic tensioner shown in FIG. 12 in a state at the start of the internal combustion engine.

In starting the internal combustion engine 1, the solenoid actuator 82 is activated to make the control valve V function as a check valve as shown in FIG. 14 so that the leak passage 80 is closed and, subsequently, the motor 96 is actuated to turn the crankshaft 93 through an angle of 180° to the base plate 91 together with the piston PS away from the first member 11 so that the pressure in the pressure chamber P is raised and the second member 12 is moved away from the first member 11 to extend the hydraulic automatic tensioner 10F. Thus, a high tension can be applied to the belt 6 before actuating the electric motor 4 to start the internal combustion engine 1. After the electric motor 4 has been started, the power of the electric motor 4 can be surely transmitted by the belt 6 to the crankshaft 1b of the internal combustion engine 1 to start the internal combustion engine smoothly.

Upon the detection of the complete start of the internal combustion engine 1, power supply to the electric motor 4 is stopped, the solenoid actuator 82 is deactivated to set the hydraulic automatic tensioner 10F in a normal operating state. The motor 96 is energized to turn the crankshaft 93 through an angle of 180° to the initial position shown in FIG. 12.

Upon the start of the internal combustion engine 1, the belt 6 slackens suddenly. Since the pressure chamber P is pressurized to inhibit the movement of the second member 12 toward the first member 11 immediately before the start of the internal combustion engine 1, the belt 6 slackens slightly, the second member 12 is moved quickly away from the first member to tension the belt 6 properly, and hence the belt 6 does not slip and is able to transmit power with reliability.

Thus, the belt 6 may be tensioned at the minimum permissible tension while the internal combustion engine 1 is operating in a normal operating mode, loads on the bearings of the engine accessories are reduced, the belt 6 does not need to be a belt of a large load capacity, and the power transmitting mechanism is a rational belt-drive transmission mechanism.

A hydraulic automatic tensioner 10G in a seventh embodiment of the present invention will be described with reference to FIGS. 15 and 16. The pressure chamber and the fluid-reservoir chamber of each of the hydraulic automatic tensioners in the foregoing embodiments are connected by the connecting passage and the leak passage. The hydraulic automatic tensioner 10G in the seventh embodiment is simple in construction and is provided with only a connecting passage.

The hydraulic automatic tensioner 10G is the same in construction as the hydraulic automatic tensioner 10C shown in FIGS. 6 and 7, except that the hydraulic automatic tensioner 10G is not provided with any passage, any control valve and any solenoid actuators respectively corresponding to the leak passage 30, the control valve V and the solenoid actuator 32. The hydraulic automatic tensioner 10G has a pressure chamber P and a fluid-reservoir chamber R connected by only a pressurizing passage 41. Parts of the hydraulic automatic tensioner 10G like or corresponding to those of the hydraulic automatic tensioner 10C are designated by the same reference characters and the description thereof will be omitted. In the seventh embodiment, a first check valve 44 is placed in a part, on the side of the pressure chamber P with respect to a pressurizing chamber 42, of the pressurizing passage 41, and a second check valve 43 is placed in a part, on the side of the fluid-reservoir chamber R with respect to the pressurizing chamber 42, of the pressurizing passage 41.

Figure 15:
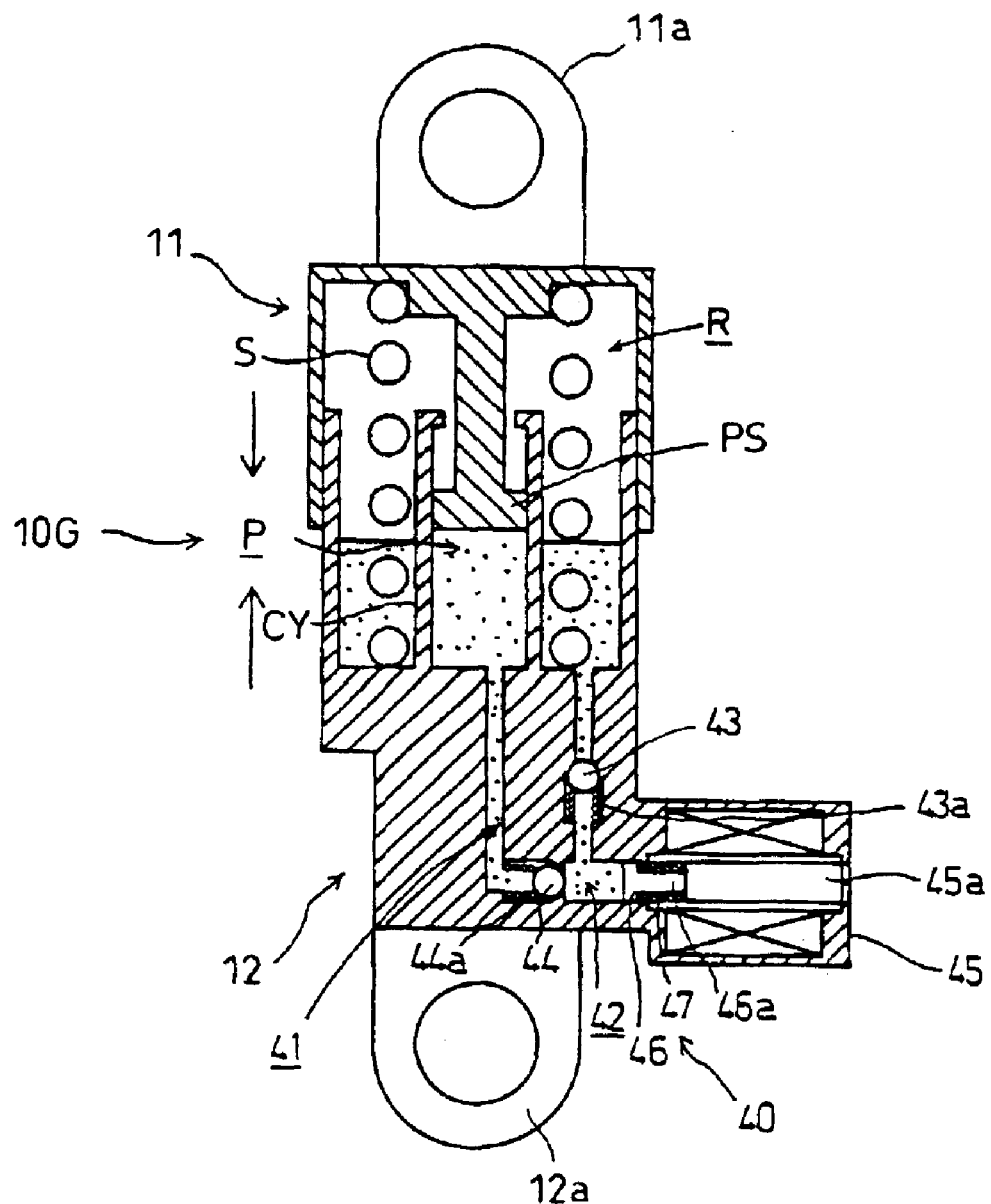
FIG. 15 is a longitudinal sectional view of a hydraulic automatic tensioner in a seventh embodiment of the present invention in a normal state.

When the tension of the belt 6, i.e., the transmission member, increases greatly, the first check valve 44 inhibits the flow of the hydraulic fluid from the pressure chamber P into the fluid-reservoir chamber R as shown in FIG. 15 so that the hydraulic automatic tensioner 10G is locked and the tension of the belt 6 maintained. At the same time, a pressurizing mechanism 40 operates to make the hydraulic automatic tensioner 10G apply a higher tension to the belt 6. Thus, the hydraulic automatic tensioner 10G can be adjusted in the direction in which it extends.

Figure 16:
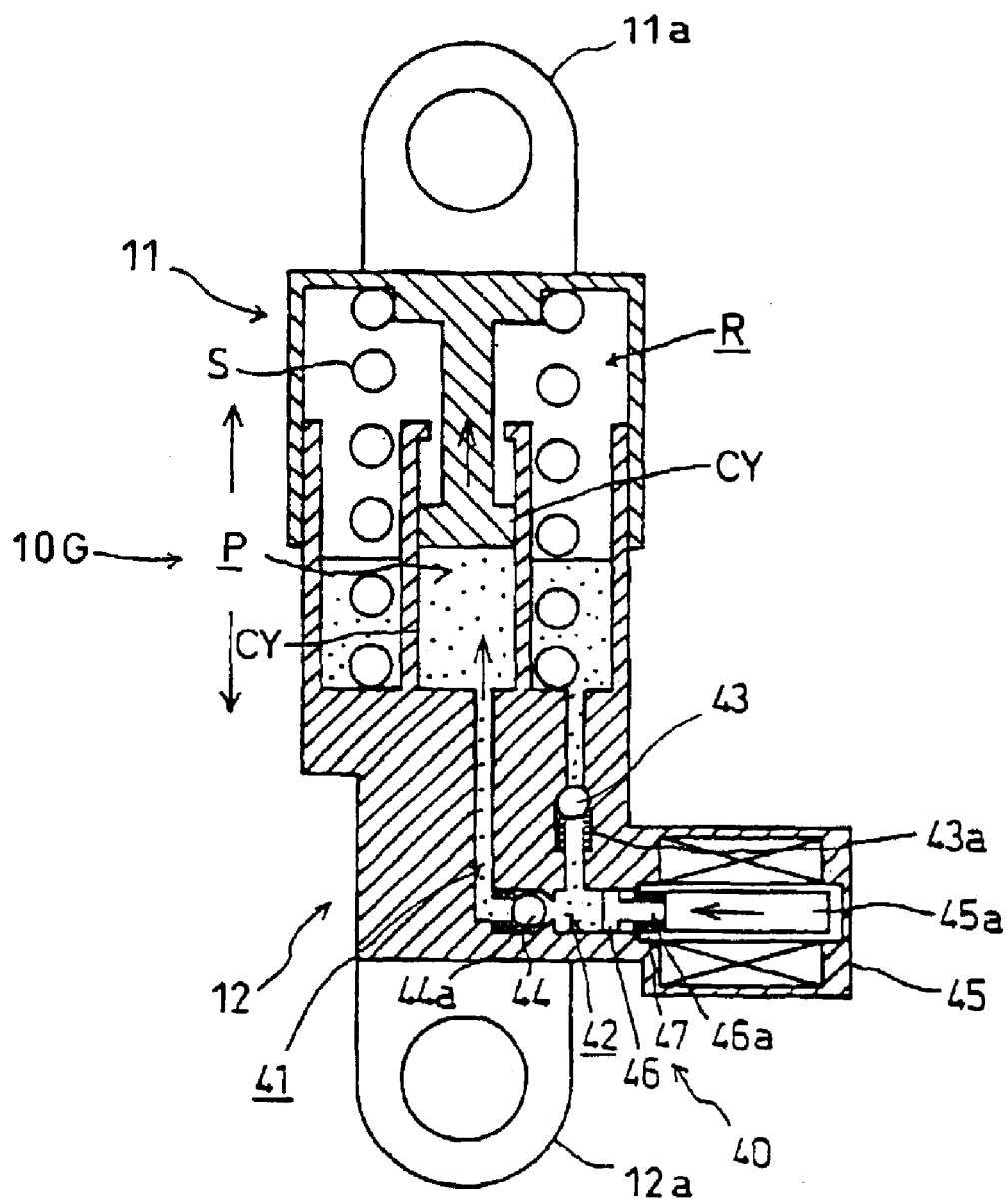
FIG. 16 is a longitudinal sectional view of the hydraulic automatic tensioner shown in FIG. 15 in a state at the start of the internal combustion engine.

When a solenoid actuator 45 is activated, the pressure in the pressurizing chamber 42 rises, the second check valve 43 closes to inhibit the flow of the hydraulic fluid from the pressure chamber P into the fluid-reservoir chamber R, the first check valve 44 opens to supply the hydraulic fluid into the pressure chamber P as shown in FIG. 16. Consequently, the hydraulic automatic tensioner 10G extends to increase the tension of the belt 6. Thus, the belt 6 can be properly tensioned when an excessive tension is applied to the belt 6. Since the hydraulic automatic tensioner 10G is not provided with any passage, any control valve and any solenoid actuators respectively corresponding to the leak passage 30, the control valve V and the solenoid actuator 32, the hydraulic automatic tensioner 10G is simple in construction and compact and lightweight.

Although the preferred embodiments of the present invention has been described as applied to the internal combustion engine provided with the electric motor serving as a starter motor, the present invention is applicable also to an internal combustion engine provided with an electric motor that operates simultaneously with the internal combustion engine to supply a deficiency in the output of the internal combustion engine, and to an internal combustion engine provided with an electric motor that operates for driving only engine accessories, such as an air conditioner, while the internal combustion engine is stopped.

Figure 17:
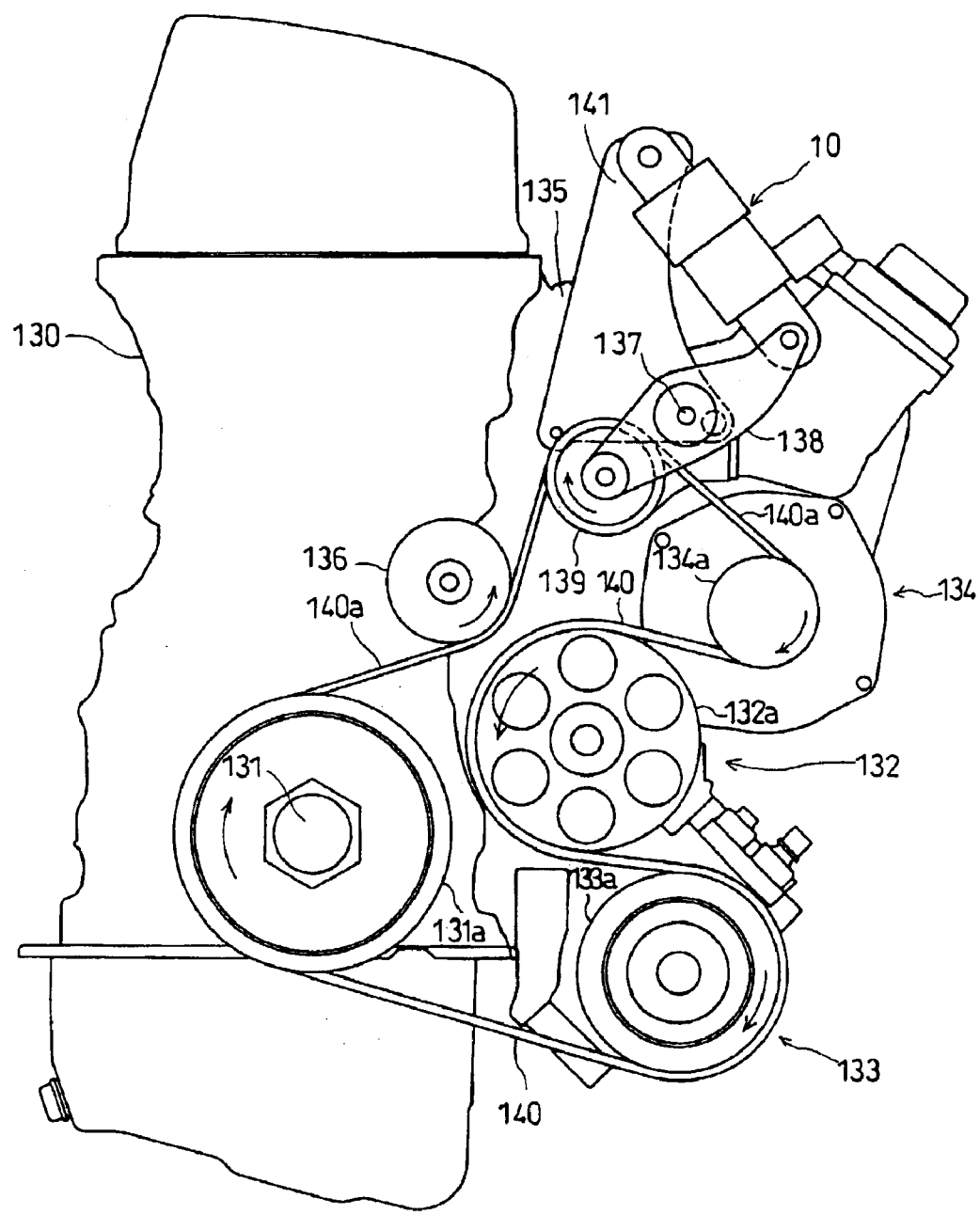
FIG. 17 is a schematic side elevation of another internal combustion engine provided with a power transmitting mechanism for transmitting power to the engine accessories of the internal combustion engine, including a hydraulic automatic tensioner according to the present invention.

FIG. 17 shows an internal combustion engine 130 provided with an engine accessory driving mechanism employing one of the hydraulic automatic tensioners 10A to 10G. As shown in FIG. 17, a water pump 132, a compressor 133 for an air conditioner and an electric motor 134 that serves as a generator and a starting motor are held on an accessory bracket 135 attached to the internal combustion engine 130.

A crankshaft pulley 131a is mounted on an end part, projecting from the internal combustion engine 130, of the crankshaft 131 of the internal combustion engine 130. A pulley 132a of a pump, a pulley 133a of a compressor, a drive pulley 134 of an electric motor, an idler pulley 136 and a tension pulley 139 are arranged in a plane including the crankshaft pulley 131a. The idler pulley 136 is supported at a fixed position. The tension pulley 139 is supported on one end of a swing lever 138 having a middle part supported for turning by a shaft 137. An endless belt 140 is extended around the six pulleys 131a, 122a, 133a, 134a, 138a and 139.

The belt 140 runs clockwise as viewed in FIG. 17 successively via the crankshaft pulley 131, the idler pulley 136, the tension pulley 133a, the drive pulley 134a, the pulley 132a and the pulley 133a, and returns to the crankshaft pulley 131a.

The hydraulic automatic tensioner 10 has one end connected to an upper part of a support plate 141 projecting upward from the accessory bracket 135, and the other end connected to the other end of the swing lever 138. When the hydraulic automatic tensioner 10 extends, the swing lever 138 is turned clockwise to increase the tension of the belt 140 wound around the tension pulley 139.

The hydraulic automatic tensioner 10 embodying the present invention has the first member 11 attached to the internal combustion engine, and the second member 12 connected to the swing lever 138 supporting the tension pulley 139 tightening the belt 140. The second member 12 may be attached to the internal combustion engine, and the first member 11 may be connected to the swing lever 138.

When the second member provided with the operating rod, the control valve and the check valves is attached to the internal combustion engine, direct propagation of vibrations of the belt to the operating rod, the control valve and the check valves can be avoided. Thus, the possibility of the breakage of the operating rod due to vibration, the malfunction of the control valve and the check valves due to vibration and the resulting leakage of the hydraulic fluid can be reduced to the lest possible extent.

The foregoing embodiments close the control valve V to close the leak passage in starting the internal combustion engine by the electric motor 4. The present invention is applicable also to an internal combustion engine provided with an electric motor that operates simultaneously with the internal combustion engine to supply a deficiency in the output of the internal combustion engine, and to an internal combustion engine provided with an electric motor that operates for driving only engine accessories, such as an air conditioner, while the internal combustion engine is stopped.

When the electric motor operates, a very high tension is applied to the transmission member and a reactive force acts on the hydraulic automatic tensioner. Therefore, the excessive contraction of the hydraulic automatic tensioner is prevented by closing the leak passage by the control valve, and the transmission member is properly tensioned after the operation of the electric motor has been stabilized, so that power can be always surely transmitted to driven members.

What is claimed is:

1. A hydraulic automatic tensioner for adjusting tension of an endless transmission member included in a power transmitting mechanism for transmitting power to engine accessories of an internal combustion engine through the transmission member, said hydraulic automatic tensioner comprising:

a first member;

a piston formed integrally with the first member;

a second member coaxially combined with the first member so as to be axially movable relative to the first member, said second member defining a fluid-reservoir chamber together with the first member and provided with a leak passage;

a cylinder formed integrally with the second member and axially slidably receiving the piston so as to form a pressure chamber filled with a hydraulic fluid;

an elastic member pushing the first and the second member away from each other;

a control valve placed in the leak passage to normally prevent flow of the hydraulic fluid from the pressure chamber through the leak passage into the fluid-reservoir chamber; and a control device for changing over the control valve between a normal position that prevents flow of the hydraulic fluid from the pressure chamber into the fluid-reservoir chamber and an other position that makes normal function of the control valve ineffective to permit flow of the hydraulic fluid from the pressure chamber into the fluid-reservoir chamber.

2. The hydraulic automatic tensioner according to claim 1, wherein the control valve is a check valve.

3. The hydraulic automatic tensioner according to claim 1, wherein the control device includes means for opening the control valve when the same is deactivated and means for closing the control valve when the same is activated.

4. The hydraulic automatic tensioner according to claim 1 further provided with a connecting passage connecting the pressure chamber and the fluid-reservoir chamber, and further comprising a check valve placed in the connecting passage and capable of permitting flow of the hydraulic fluid from the fluid-reservoir chamber into the pressure chamber and of stopping reverse flow of the hydraulic fluid.

5. The hydraulic automatic tensioner according to claim 1, wherein the pressure chamber is formed in the fluid-reservoir chamber.

6. The hydraulic automatic tensioner according to claim 1 further comprising a pressurizing mechanism for applying pressure to the pressure chamber.

7. The hydraulic automatic tensioner according to claim 6, wherein the pressurizing mechanism includes a pressurizing member linearly movably fitted in a pressurizing passage connected to the pressure chamber, and a linear driving means; and the pressurizing member is moved linearly in the pressurizing passage to force the hydraulic fluid from the pressurizing passage into the pressure chamber.

8. The hydraulic automatic tensioner according to claim 6, wherein the pressurizing mechanism is a crank mechanism including a crankshaft and a crankshaft driving means; and the piston is driven by the crank mechanism to pressurize the pressure chamber.

9. The hydraulic automatic tensioner according to claim 6, wherein the pressurizing passage is connected to the leak passage.

10. The hydraulic automatic tensioner according to claim 9 further comprising a connecting passage connecting the pressure chamber and the fluid-reservoir chamber, the pressuring passage being connected to the connecting passage.

11. A power transmitting mechanism for transmitting power to engine accessories of an internal combustion engine, said power transmitting mechanism comprising:
   an endless transmission member for driving the engine accessories; and
   a hydraulic automatic tensioner for regulating tension of the transmission member;
   wherein the hydraulic automatic tensioner comprises:
   a first member;
   a piston formed integrally with the first member;
   a second member coaxially combined with the first member so as to be axially movable relative to the first member, defining a fluid-reservoir chamber together with the first member, and provided with a leak passage;
   a cylinder formed integrally with the second member and axially slidably receiving the piston so as to form a pressure chamber filled with a hydraulic fluid;
   an elastic member pushing the first and the second member away from each other;
   a control valve placed in the leak passage to normally prevent flow of the hydraulic fluid from the pressure chamber through the leak passage into the fluid-reservoir chamber; and
   a control device for changing over the control valve between a normal position that prevents flow of the hydraulic fluid from the pressure chamber into the fluid-reservoir chamber and an other position that makes normal function of the control valve ineffective to permit flow of the hydraulic fluid from the pressure chamber into the fluid-reservoir chamber.

12. The power transmitting mechanism according to claim 11, wherein the control valve is a check valve.

13. The power transmitting mechanism according to claim 11, wherein the control device includes means for opening the control valve when the same is deactivated, and means for closing the control valve when the same is activated.

14. The power transmitting mechanism according to claim 11 further provided with a connecting passage connecting the pressure chamber and the fluid-reservoir chamber, and further comprising a check valve placed in the connecting passage and capable of permitting flow of the hydraulic fluid from the fluid-reservoir chamber into the pressure chamber and of stopping reverse flow of the hydraulic fluid.

15. The power transmitting mechanism according to claim 11 further comprising a pressurizing mechanism for applying pressure to the pressure chamber.

16. The power transmitting mechanism according to claim 15, wherein the pressurizing mechanism includes a pressurizing member linearly movably placed in a pressurizing passage connected to the pressure chamber, and linear driving means; and the pressurizing member is moved linearly in the pressuring passage to force the hydraulic fluid from the pressurizing passage into the pressure chamber.

17. The power transmitting mechanism according to claim 15, wherein the pressurizing mechanism is a crank mechanism including a crankshaft and a crankshaft driving means, and the piston is driven by the crank mechanism to pressurize the pressure chamber.

18. The power transmitting mechanism according to claim 15, wherein the pressurizing passage is connected to the leak passage.

19. The power transmitting mechanism according to claim 18, wherein the hydraulic automatic tensioner is further provided with a connecting passage connecting the fluid-reservoir chamber and the pressure chamber, and the pressurizing passage is connected to the connecting passage.

20. The power transmitting mechanism according to claim 11 further comprising an operating means for operating the pressurizing mechanism, wherein the engine accessories include at least an electric motor, and the operating means operates the pressurizing mechanism before the electric motor is actuated.

21. The power transmitting mechanism according to claim 20, wherein the second member exerts a pressure to a side of the transmission member that is a slack side when the internal combustion engine drives the transmission member and is a tight side when the electric motor drives the transmission member.

22. The power transmitting mechanism according to claim 20, wherein the control device is activated only when the electric motor operates for driving.

23. The power transmitting mechanism according to claim 20, wherein the electric motor is made to serve also as a generator.

* * * * *